US012652724B2

(12) United States Patent
Kang et al.

(10) Patent No.: US 12,652,724 B2
(45) Date of Patent: Jun. 9, 2026

(54) METHOD AND APPARATUS FOR ENHANCED CONNECTED MODE DISCONTINUOUS RECEPTION IN WIRELESS COMMUNICATION SYSTEM

(71) Applicant: Samsung Electronics Co., Ltd., Gyeonggi-do (KR)

(72) Inventors: Hyunjeong Kang, Gyeonggi-do (KR); Anil Agiwal, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 359 days.

(21) Appl. No.: 18/326,572

(22) Filed: May 31, 2023

(65) Prior Publication Data

US 2023/0389124 A1 Nov. 30, 2023

(30) Foreign Application Priority Data

May 31, 2022 (KR) ........................ 10-2022-0066688
Jun. 7, 2022 (KR) ........................ 10-2022-0069051

(51) Int. Cl.
*H04W 76/28* (2018.01)
*H04L 1/00* (2006.01)
*H04W 72/23* (2023.01)

(52) U.S. Cl.
CPC .......... *H04W 76/28* (2018.02); *H04L 1/0061* (2013.01); *H04W 72/23* (2023.01)

(58) Field of Classification Search
CPC ................ H04W 76/28; H04W 72/23; H04W 52/0229; H04W 52/0216; H04W 72/0446; H04W 72/1268; H04W 72/232; H04L 1/0061; H04L 1/1851; H04L 1/1896; Y02D 30/70

See application file for complete search history.

(56) References Cited

U.S. PATENT DOCUMENTS

| | | | |
|---|---|---|---|
| 2007/0133479 A1 | 6/2007 | Montojo et al. | |
| 2018/0302820 A1 | 10/2018 | Heo et al. | |
| 2021/0250865 A1 | 8/2021 | Turtinen et al. | |
| 2022/0116875 A1* | 4/2022 | Nimbalker | ........ H04W 52/0216 |
| 2022/0174598 A1* | 6/2022 | Seo | ........................ H04W 68/02 |
| 2023/0209647 A1* | 6/2023 | Khoshkholgh Dashtaki | ............... H04L 1/1822 |

FOREIGN PATENT DOCUMENTS

| | | |
|---|---|---|
| WO | WO 2021/029724 | 2/2021 |
| WO | WO 2022/083761 | 4/2022 |

OTHER PUBLICATIONS

China Telecom, "Discussion on XR Enhancement for NR", R1-2203666, 3GPP TSG RAN WG1 Meeting #109-e, May 9-20, 2022, 5 pages.
European Search Report dated Apr. 22, 2025 issued in counterpart application No. 23816323.2-1206, 7 pages.

(Continued)

*Primary Examiner* — Dady Chery
(74) *Attorney, Agent, or Firm* — The Farrell Law Firm, P.C.

(57) ABSTRACT

The disclosure relates to a 5G or 6G communication system for supporting a higher data transmission rate, i.e., a connected mode DRX enhancement, and handling a timer for an SDT procedure in a wireless communication system.

16 Claims, 19 Drawing Sheets

Step 0 : UE receives the signaling message (e.g. RRC Reconfiguration message) including the DRX configuration/parameters and DCP configuration/parameters — 400

Step 1: UE first identifies the subframe which satisfies [(SFN x 10) + subframe number] modulo (drx-LongCycle) = drx-StartOffset. drx-LongCycle and drx-Start Offset are received in the signaling message — 410

Step 2: UE then identifies/determines starting time of on duration timer, starting time of on duration timer is at drx-SlotOffset from the beginning of the identified/determined (in step 1) subframe. drx-SlotOffset is received in the signaling message — 420

Step 3: From the identified/determined (in step 2) starting time of the on duration timer, UE then identifies/determines the starting of DCP monitoring, DCP monitoring starts at ps-Offset prior to a slot from the identified/determined (in step 2) starting time of on duration timer. ps-Offset is received in the signaling message — 430

Step 4: UE received DCP in one of the slot monitored for DCP and DCP indicates (i.e. wakeup indication bit for UE is set to 1) UE to start the on duration timer. If DCP includes 'offset', UE starts drx-onDurationTimer after offset (in slots) from the end of the slot in which DCP is received. If DCP does not include 'offset', UE start drx-onDurationTimer after drx-SlotOffset from the beginning of the subframe identified in step 1. — 440

(56) References Cited

OTHER PUBLICATIONS

CATT, "Correction to TC 7.1.1.12.3 DRX Adaptation / UE Wakeup Indication", R5-220525, 3GPP TSG-RAN WG5 Meeting 94-e, Feb. 21-Mar. 4, 2022, 13 pages.
CATT, Summary of Open Issues for PDCCH, R2-2001913, 3GPP TSG-RAN WG2 Meeting #109-e, Feb. 24-28, 2020, 13 pages.
International Search Report dated Sep. 5, 2023 issued in counterpart application No. PCT/KR2023/007341, 8 pages.

* cited by examiner

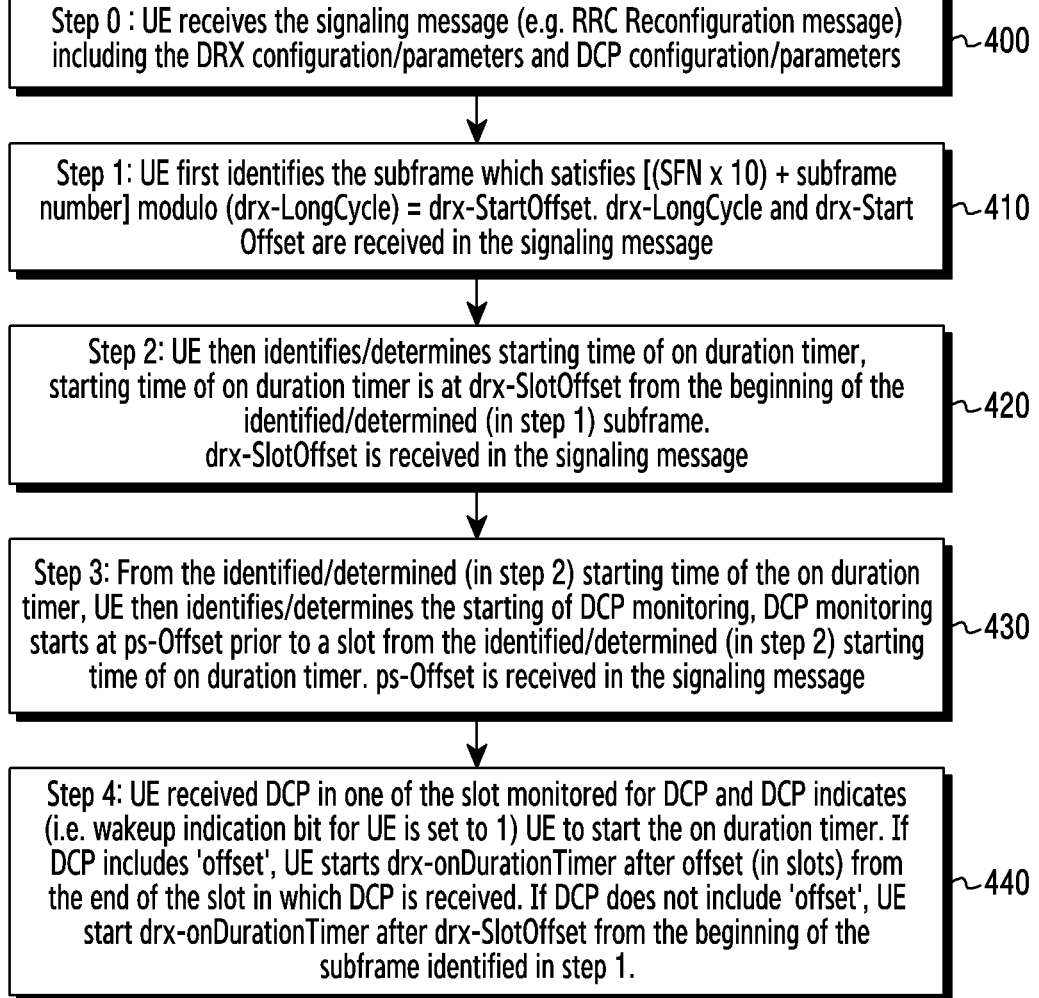

Step 0 : UE receives the signaling message (e.g. RRC Reconfiguration message) including the DRX configuration/parameters and DCP configuration/parameters ~400

Step 1: UE first identifies the subframe which satisfies [(SFN x 10) + subframe number] modulo (drx-LongCycle) = drx-StartOffset. drx-LongCycle and drx-Start Offset are received in the signaling message ~410

Step 2: UE then identifies/determines starting time of on duration timer, starting time of on duration timer is at drx-SlotOffset from the beginning of the identified/determined (in step 1) subframe. drx-SlotOffset is received in the signaling message ~420

Step 3: From the identified/determined (in step 2) starting time of the on duration timer, UE then identifies/determines the starting of DCP monitoring, DCP monitoring starts at ps-Offset prior to a slot from the identified/determined (in step 2) starting time of on duration timer. ps-Offset is received in the signaling message ~430

Step 4: UE received DCP in one of the slot monitored for DCP and DCP indicates (i.e. wakeup indication bit for UE is set to 1) UE to start the on duration timer. If DCP includes 'offset', UE starts drx-onDurationTimer after offset (in slots) from the end of the slot in which DCP is received. If DCP does not include 'offset', UE start drx-onDurationTimer after drx-SlotOffset from the beginning of the subframe identified in step 1. ~440

FIG.4

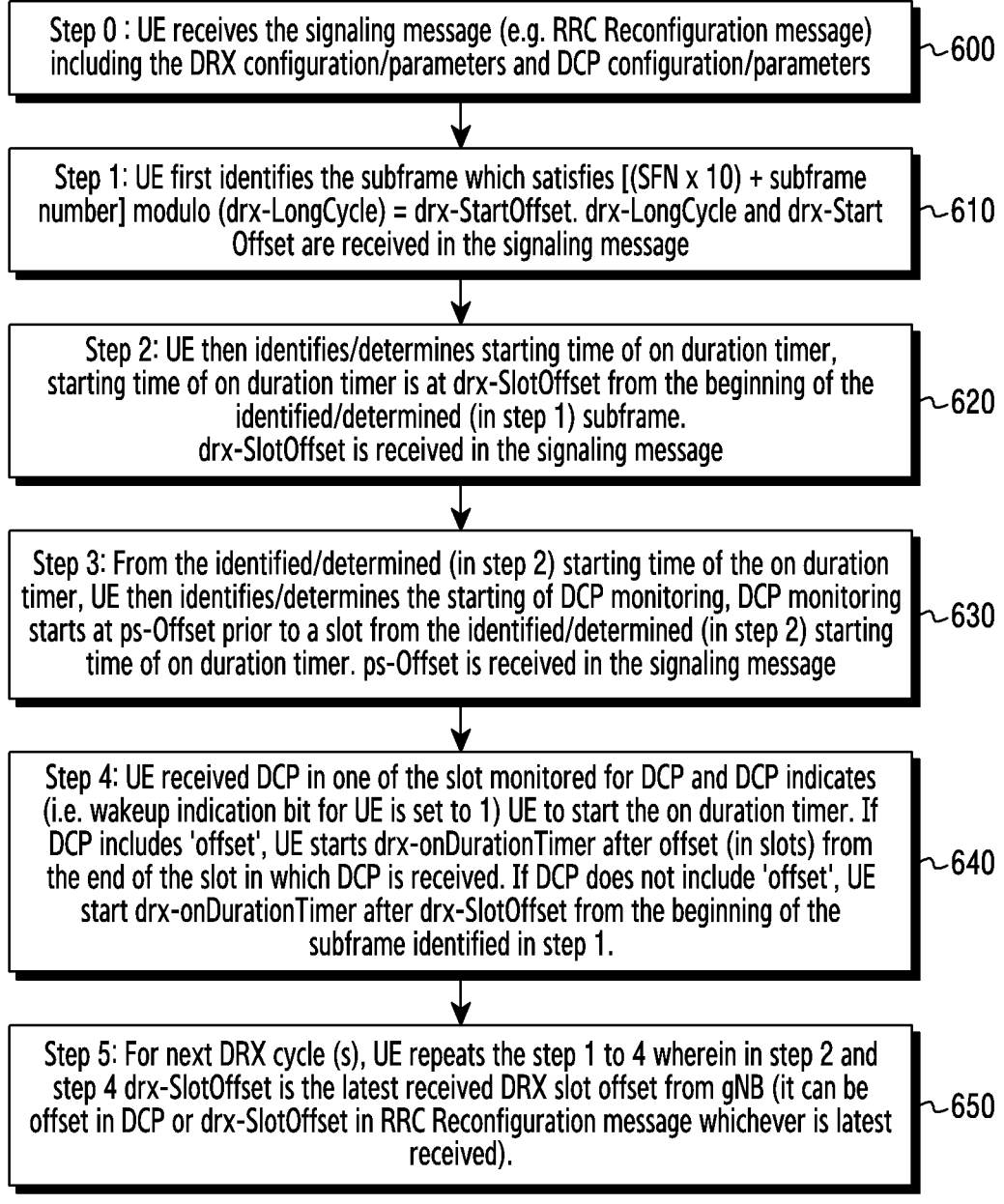

Step 0 : UE receives the signaling message (e.g. RRC Reconfiguration message) including the DRX configuration/parameters and DCP configuration/parameters ~600

Step 1: UE first identifies the subframe which satisfies [(SFN x 10) + subframe number] modulo (drx-LongCycle) = drx-StartOffset. drx-LongCycle and drx-Start Offset are received in the signaling message ~610

Step 2: UE then identifies/determines starting time of on duration timer, starting time of on duration timer is at drx-SlotOffset from the beginning of the identified/determined (in step 1) subframe. drx-SlotOffset is received in the signaling message ~620

Step 3: From the identified/determined (in step 2) starting time of the on duration timer, UE then identifies/determines the starting of DCP monitoring, DCP monitoring starts at ps-Offset prior to a slot from the identified/determined (in step 2) starting time of on duration timer. ps-Offset is received in the signaling message ~630

Step 4: UE received DCP in one of the slot monitored for DCP and DCP indicates (i.e. wakeup indication bit for UE is set to 1) UE to start the on duration timer. If DCP includes 'offset', UE starts drx-onDurationTimer after offset (in slots) from the end of the slot in which DCP is received. If DCP does not include 'offset', UE start drx-onDurationTimer after drx-SlotOffset from the beginning of the subframe identified in step 1. ~640

Step 5: For next DRX cycle (s), UE repeats the step 1 to 4 wherein in step 2 and step 4 drx-SlotOffset is the latest received DRX slot offset from gNB (it can be offset in DCP or drx-SlotOffset in RRC Reconfiguration message whichever is latest received). ~650

FIG.6

METHOD AND APPARATUS FOR ENHANCED CONNECTED MODE DISCONTINUOUS RECEPTION IN WIRELESS COMMUNICATION SYSTEM

CROSS-REFERENCE TO RELATED APPLICATION(S)

This application is based on and claims priority under 35 U.S.C. § 119 to Korean Patent Application Nos. 10-2022-0066688 and 10-2022-0069051, which were filed in the Korean Intellectual Property Office on May 31, 2022 and Jun. 7, 2022, respectively, the entire disclosure of each of which is incorporated herein by reference.

BACKGROUND

1. Field

The disclosure relates generally to a wireless (or mobile) communication system, and more particularly, to an apparatus, a method and a system for enhanced connected mode discontinuous reception (DRX) in wireless communication system, and a system and method of handling a timer for a small data transmission (SDT) in a wireless communication system.

2. Related Art $5^{th}$ generation (5G) mobile communication technologies define broad frequency bands such that high transmission rates and new services are possible, and can be implemented in "sub 6 gigahertz (GHz)" bands such as 3.5 GHz, and in "above 6 GHz" bands referred to as mmWave, including 28 GHz and 39 GHz. In addition, it has been considered to implement $6^{th}$ generation (6G) mobile communication technologies (referred to as "beyond 5G systems") in terahertz (THz) bands (e.g., 95 GHz to 3 THz bands) in order to accomplish transmission rates fifty times faster than 5G mobile communication technologies and ultra-low latencies one-tenth of 5G mobile communication technologies.

Since the initial development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multiple-input multiple-output (MIMO) for mitigating radio-wave path loss and increasing radio-wave transmission distances in mmWave, supporting numerologies (e.g., operating multiple subcarrier spacings (SCSs)) for efficiently utilizing mmWave resources and dynamic operation of slot formats, initial access technologies for supporting multi-beam transmission and broadbands, definition and operation of a bandwidth part (BWP), new channel coding methods such as a low density parity check (LDPC) code for large amount of data transmission and a polar code for highly reliable transmission of control information, layer 2 (L2) pre-processing, and network slicing for providing a dedicated network specialized to a specific service.

Currently, there are ongoing discussions regarding improvement and performance enhancement of initial 5G mobile communication technologies in view of services to be supported by newer 5G mobile communication technologies, and there has been physical layer standardization regarding technologies such as vehicle-to-everything (V2X)

for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR user equipment (UE) power saving, non-terrestrial network (NTN), which is a UE-satellite direct communication for providing coverage in an area in which communication with terrestrial networks is unavailable, and positioning.

There has also been ongoing standardization in air interface architecture/protocol regarding technologies such as industrial Internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access (RA) for simplifying RA procedures (2-step RACH for NR). There also has been ongoing standardization in system architecture/service regarding a 5G baseline architecture (e.g., service based architecture or service based interface) for combining network functions virtualization (NFV) and software-defined networking (SDN) technologies, and mobile edge computing (MEC) for receiving services based on UE positions.

As 5G mobile communication systems are further commercialized, the number of devices that will be connected to communication networks is expected to exponentially increase, and it is also expected that enhanced functions and performances of 5G mobile communication systems and integrated operations of connected devices will be necessary. To this end, new research is scheduled in connection with extended reality (XR) for efficiently supporting augmented reality (AR), virtual reality (VR), mixed reality (MR), etc., 5G performance improvement and complexity reduction by utilizing artificial intelligence (AI) and machine learning (ML), AI service support, metaverse service support, and drone communication.

Further, such development of 5G mobile communication systems will serve as a basis for developing not only new waveforms for providing coverage in THz bands of 6G mobile communication technologies, multi-antenna transmission technologies such as full dimensional MIMO (FD-MIMO), array antennas and large-scale antennas, metamaterial-based lenses and antennas for improving coverage of THz band signals, high-dimensional space multiplexing technology using orbital angular momentum (OAM), and reconfigurable intelligent surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Accordingly, a need exists for an enhanced DRX operation for a connected mode. Also, needs exist for enhanced handling of timers for SDT operation.

SUMMARY

Accordingly, this disclosure is provided to address at least the above-mentioned problems and/or disadvantages and to provide at least the advantages described below.

An aspect of the disclosure is to provide a communication method and system for converging a 5G communication system for supporting higher data rates beyond a 4$^{th}$ generation (4G) communication system.

In accordance with an aspect of the disclosure, a method is provided for a terminal. The method includes receiving, from a base station, a DRX configuration and a downlink control information (DCI) with cyclic redundancy check (CRC) scrambled by power saving radio network temporary identifier (PS-RNTI) (DCP) monitoring configuration; receiving, from the base station, a DCP associated with a DRX cycle based on the DRX configuration and the DCP monitoring configuration, wherein the DCP includes an indication to start a DRX on-duration timer; identifying whether offset information is included in the DCP; and in case that the offset information is included in the DCP, starting the DRX on-duration timer after an offset obtained from the offset information, from an end of a slot in which the DCP was received.

In accordance with another aspect of the disclosure, a terminal is provided. The terminal includes a transceiver; and a controller coupled with the transceiver and configured to: receive, from a base station, a DRX configuration and a DCP monitoring configuration, receive, from the base station, a DCP associated with a DRX cycle based on the DRX configuration and the DCP monitoring configuration, wherein the DCP includes an indication to start a DRX on-duration timer, identify whether offset information is included in the DCP, and in case that the offset information is included in the DCP, start the DRX on-duration timer after an offset obtained from the offset information, from an end of a slot in which the DCP was received.

In accordance with another aspect of the disclosure, a method is provided for a base station. The method includes transmitting, to a terminal, a DRX configuration and a DCP monitoring configuration; and transmitting, to the terminal, a DCP associated with a DRX cycle based on the DRX configuration and the DCP monitoring configuration, wherein the DCP includes an indication to start a DRX on-duration timer, and wherein, in case that an offset information is included in the DCP, the DRX on-duration timer is started after an offset based on the offset information, from an end of a slot in which the DCP was transmitted.

In accordance with another aspect of the disclosure, a base station is provided. The base station includes a transceiver; and a controller coupled with the transceiver and configured to transmit, to a terminal, a DRX configuration and a DCP monitoring configuration, and transmit, to the terminal, a DCP associated with a DRX cycle based on the DRX configuration and the DCP monitoring configuration, wherein the DCP includes an indication to start a DRX on-duration timer, and wherein, in case that an offset information is included in the DCP, the DRX on-duration timer is started after an offset based on the offset information, from an end of a slot in which the DCP was transmitted.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a flow chart is illustrating UE operations in accordance with an embodiment;

FIG. 6 is a flow chart illustrating UE operations in accordance with an embodiment;

DETAILED DESCRIPTION

Figure 1:
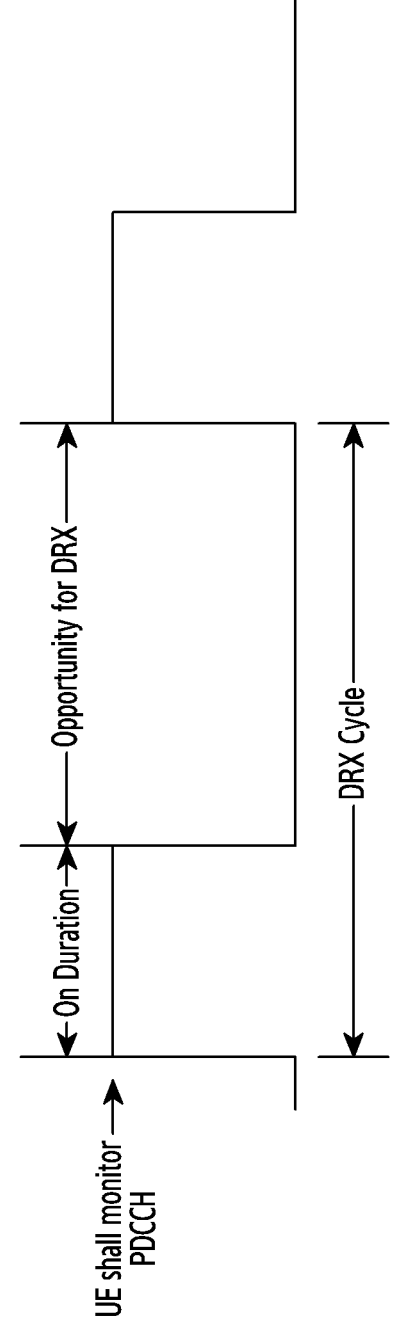
FIG. 1 illustrates a DRX cycle in accordance with an embodiment.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are used by the inventor to enable a clear and consistent understanding of the disclosure. Accordingly, those skilled in the art will understand that the following description of various embodiments of the disclosure is provided for illustration purpose only and not for the purpose of limiting the disclosure as defined by the appended claims and their equivalents.

Herein, singular forms such as "a," "an," and "the" include plural referents unless the context clearly dictates otherwise. Thus, for example, reference to "a component surface" includes reference to one or more of such surfaces.

The term "substantially" means that the recited characteristic, parameter, or value need not be achieved exactly, but that deviations or variations, including, e.g., tolerances, measurement error, measurement accuracy limitations and other factors known to those of skill in the art, may occur in amounts that do not preclude the effect the characteristic was intended to provide.

Blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, e.g., a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, sub-routines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Some terms and/or definitions for understanding the disclosure are described below, but these terms should be construed in a non-limiting way.

A "base station (BS)" is an entity communicating with a UE and may also be referred to as Ba base transceiver station (BTS), a node B (NB), an evolved NB (eNB), an access point (AP), a 5G NB (5GNB), or a gNB.

A "UE" is an entity communicating with a BS and may also be referred to as a device, a mobile station (MS), a mobile equipment (ME), or a terminal.

The Internet is now evolving to the Internet of things (IoT), wherein distributed entities, i.e., things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), etc., have been recently researched. Such an IoT environment may provide intelligent Internet technology services that create a new value to human life by collecting and analyzing data generated among connected things. IoT may be applied to a variety of fields including smart homes, smart buildings, smart cities, smart or connected cars, smart grids, health care, smart appliances, and advanced medical services through convergence and combination between existing information technology and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud radio access network (RAN) as the above-described Big Data processing technology may also be considered to be as an example of convergence between the 5G technology and the IoT technology.

Carrier Aggregation (CA)/Multi-Connectivity in 5G Wireless Communication System

A 5G wireless communication system supports a stand-alone mode of operation as well dual connectivity (DC). In DC, a multiple reception (Rx)/transmission (Tx) UE may be configured to utilize resources provided by two different nodes (or NBs) connected via a non-ideal backhaul. One node acts as a master node (MN) and the other as a secondary node (SN). The MN and SN are connected via a network interface and at least the MN is connected to a core network (CN).

NR also supports multiple radio access technology (multi-RAT) DC (MR-DC) operation, whereby a UE in a radio resource control (RRC) CONNECTED state is configured to utilize radio resources provided by two distinct schedulers, located in two different nodes connected via a non-ideal backhaul and providing either evolved universal mobile telecommunications system (UMTS) terrestrial radio access (E-UTRA) (i.e., if the node is an ng-eNB) or NR access (i.e., if the node is a gNB). In NR for a UE in an RRC_CON-NECTED state not configured with CA/DC, there is only one serving cell, i.e., a primary cell (PCell). For a UE in an RRC_CONNECTED state configured with CA/DC, the term "serving cells" is used to denote a set of cells including special cell(s) (SpCells) and all secondary cells (SCells).

In NR, the term master cell group (MCG) refers to a group of serving cells associated with the MN, including the PCell and optionally one or more SCells.

In NR, the term secondary cell group (SCG) refers to a group of serving cells associated with the SN, including a primary SCG cell (PSCell) and optionally one or more SCells.

In NR, a PCell refers to a serving cell in an MCG, operating on the primary frequency, in which the UE either performs an initial connection establishment procedure or initiates a connection re-establishment procedure.

In NR, for a UE configured with CA, an Scell is a cell providing additional radio resources on top of an SpCell. A PSCell refers to a serving cell in an SCG in which the UE performs RA when performing a reconfiguration with a synchronization (sync) procedure.

For a DC operation, the term SpCell refers to a PCell of an MCG or a PSCell of an SCG; otherwise, the SpCell refers to the PCell.

RA in a 5G Wireless Communication System

In a 5G wireless communication system, RA is supported. RA is used to achieve uplink (UL) time synchronization. RA is used during initial access, handover, RRC connection re-establishment procedure, scheduling request transmission, SCG addition/modification, beam failure recovery (BFR) and data or control information transmission in a UL by a non-synchronized UE in an RRC_CONNECTED state. Several types of RA procedures are supported such as contention based RA (CBRA) and contention free RA (CFRA) and each of these can be one 2 step or 4 step RA.

CBRA: This is also referred as 4 step CBRA. In this type of RA, a UE first transmits an RA preamble (also referred as Msg1) and then waits for an RA response (RAR) in an RAR window. RAR is also referred as Msg2.

A next generation node B (gNB) transmits the RAR on a physical downlink shared channel (PDSCH). A physical downlink control channel (PDCCH) scheduling the PDSCH carrying the RAR is addressed to an RA-radio network temporary identifier (RA-RNTI). The RA-RNTI identifies the time-frequency resource (also referred as a physical RA channel (PRACH) occasion, a PRACH Tx occasion, or an RA channel (RACH) occasion) in which an RA preamble was detected by the gNB.

The RA-RNTI may be calculated as follows:

$$RA\text{-}RNTI = 1 + s\_id + 14 * t\_id + 14 * 80 * f\_id + 14 * 80 * 8 * ul\_carrier\_id,$$

where s_id is the index of the first orthogonal frequency division multiplexing (OFDM) symbol of the PRACH occasion where a UE has transmitted Msg1, i.e., an RA preamble; $0 <= s\_id < 14$; t_id is the index of the first slot of the PRACH occasion ($0 <= t\_id < 80$); fid is the index of the PRACH occasion within the slot in the frequency domain ($0 <= f\_id < 8$), and ul_carrier_id is the UL carrier used for Msg1 transmission (0 for normal UL (NUL) carrier and 1 for supplementary UL (SUL) carrier.

Several RARs for various RA preambles detected by a gNB can be multiplexed in the same RAR medium access control (MAC) protocol data unit (PDU) by the gNB. An RAR in a MAC PDU corresponds to a UE's RA preamble transmission if the RAR includes an RA preamble identifier (RAPID) of RA preamble transmitted by the UE. If the RAR corresponding to its RA preamble transmission is not received during the RAR window and the UE has not yet transmitted the RA preamble for a configurable number of times, e.g., configured by the gNB in a RACH configuration, the UE goes back to the first step, i.e., selects an RA resource (preamble/RACH occasion) and transmits the RA preamble. A backoff may be applied before going back to first step.

If the RAR corresponding to the RA preamble transmission is received, the UE transmits message 3 (Msg3) in a UL grant received in the RAR. Msg3 may include an RRC connection request, an RRC connection re-establishment request, an RRC handover confirm, a scheduling request, a system information (SI) request, etc. Msg3 may include the UE identity (i.e., a cell-radio network temporary identifier (C-RNTI), a system architecture evolution (SAE)-temporary mobile subscriber identity (S-TMSI), or a random number).

After transmitting the Msg3, the UE starts a contention resolution timer. While the contention resolution timer is running, if the UE receives a PDCCH addressed to the C-RNTI included in Msg3, contention resolution is considered successful, the contention resolution timer is stopped and the RA procedure is completed.

While the contention resolution timer is running, if the UE receives contention resolution MAC control element (CE) including the UE's contention resolution identity (e.g., first X bits of common control channel (CCCH) service data unit (SDU) transmitted in Msg3), contention resolution is considered successful, the contention resolution timer is stopped, and the RA procedure is completed.

If the contention resolution timer expires and the UE has not yet transmitted the RA preamble for a configurable number of times, the UE goes back to first step, i.e., selects an RA resource (preamble/RACH occasion) and transmits the RA preamble. A backoff may be applied before returning to first step.

CFRA: This is also referred as legacy CFRA or 4 step CFRA. A CFRA procedure is used for scenarios such as handover where low latency is required, timing advance establishment for SCell, etc.

An Evolved node B (eNB) assigns, to the UE, a dedicated RA preamble. The UE transmits the dedicated RA preamble. The eNB transmits the RAR on a PDSCH addressed to the RA-RNTI. The RAR conveys an RAPID and timing alignment information. The RAR may also include a UL grant. The RAR is transmitted in an RAR window similar to a CBRA procedure. The CFRA is considered successfully completed after receiving the RAR including an RAPID of an RA preamble transmitted by the UE. In case the RA is initiated for BFR, CFRA is considered successfully completed if a PDCCH addressed to the C-RNTI is received in a search space for BFR. If the RAR window expires and the RA is not successfully completed and the UE has not yet transmitted the RA preamble for a configurable number of times (e.g., configured by gNB in RACH configuration), the UE retransmits the RA preamble.

For certain events such has handover and BFR, if dedicated preamble(s) are assigned to a UE, during first step of RA, i.e., during RA resource selection for Msg1 transmission UE, determines whether to transmit dedicated preamble or non-dedicated preamble. A dedicated preamble is typically provided for a subset of SSBs/CSI-RSs. If there is no SSB/CSI-RS having a DL reference signal received power (RSRP) above a threshold amongst the SSBs/CSI-RSs for which CFRA resources (i.e., dedicated preambles/RACH occasions (Ros)) are provided by a gNB, the UE selects a non-dedicated preamble. Otherwise, the UE selects a dedicated preamble. During the RA procedure, one RA attempt can be CFRA, while other RA attempt can be CBRA.

2 step contention based RA (2 step CBRA): In the first step, the UE transmits an RA preamble on a PRACH and a payload (i.e., a MAC PDU) on a physical UL shared channel (PUSCH). The RA preamble and payload transmission is also referred as MsgA.

In the second step, after MsgA transmission, the UE monitors for a response from the network (i.e., a gNB) within a configured window. The response is also referred as MsgB. A next generation node B (gNB) transmits the MsgB on a PDSCH. A PDCCH scheduling the PDSCH carrying MsgB is addressed to MsgB-radio network temporary identifier (MSGB-RNTI). The MSGB-RNTI identifies the time-frequency resource (also referred as PRACH occasion or PRACH TX occasion or RACH occasion) in which an RA preamble was detected by the gNB. The MSGB-RNTI may be calculated as follows:

$$RA\text{-}RNTI = 1 + s\_id + 14 * t\_id + 14 * 80 * f\_id + 14 * 80 * 8 * ul\_carrier\_id + 14 * 80 * 8 * 2,$$

where s_id is the index of the first OFDM symbol of the PRACH occasion where the UE has transmitted Msg1, i.e., an RA preamble; $0 <= s\_id < 14$; t_id is the index of the first slot of the PRACH occasion ($0 <= t\_id < 80$); f_id is the index of the PRACH occasion within the slot in the frequency domain (0<=f_id<8); and ul_carrier_id is the UL carrier used for Msg1 transmission (0 for normal UL (NUL) carrier and 1 for an SUL carrier.

If a CCCH SDU was transmitted in MsgA payload, the UE performs contention resolution using the contention resolution information in MsgB. The contention resolution is successful if the contention resolution identity received in MsgB matches first 48 bits of the CCCH SDU transmitted in MsgA. If the C-RNTI was transmitted in MsgA payload, the contention resolution is successful if the UE receives a PDCCH addressed to the C-RNTI. If contention resolution is successful, the RA procedure is considered successfully completed.

Instead of contention resolution information corresponding to the transmitted MsgA, MsgB may include a fallback information corresponding to the RA preamble transmitted in MsgA. If the fallback information is received, the UE transmits Msg3 and performs contention resolution using Msg4 as in CBRA procedure. If contention resolution is successful, the RA procedure is considered successfully completed. If contention resolution fails upon fallback (i.e., upon transmitting Msg3), the UE retransmits MsgA. If a configured window in which the UE monitors a network response after transmitting MsgA expires and the UE has not received MsgB including contention resolution information or fallback information as explained above, the UE retransmits MsgA. If the RA procedure is not successfully completed even after transmitting the MsgA configurable number of times, the UE fallbacks to a 4 step RACH procedure, i.e., the UE only transmits the PRACH preamble.

A MsgA payload may include one or more of CCCH SDU, dedicated control channel (DCCH) SDU, dedicated traffic channel (DTCH) SDU, buffer status report (BSR) MAC CE, power headroom report (PHR) MAC CE, SSB information, C-RNTI MAC CE, or padding. MsgA may include a UE ID (e.g., a random ID, S-TMSI, C-RNTI, resume ID, etc.) along with preamble in first step. The UE ID may be included in the MAC PDU of the MsgA. The UE ID, such as a C-RNTI, may be carried in a MAC CE, wherein the MAC CE is included in a MAC PDU. Other UE IDs (such random ID, S-TMSI, C-RNTI, resume ID, etc.) may be carried in a CCCH SDU. The UE ID can be one of a random ID, S-TMSI, C-RNTI, resume ID, IMSI, idle mode ID, inactive mode ID, etc.

The UE ID can be different in different scenarios in which UE performs the RA procedure. When the UE performs RA after power on (before it is attached to the network), then the UE ID is a random ID. When UE perform RA in an IDLE state after it is attached to network, the UE ID is an S-TMSI. If the UE has an assigned C-RNTI (e.g., in connected state), the UE ID is a C-RNTI. In case the UE is in an INACTIVE state, the UE ID is resume ID.

In addition to a UE ID, some addition control information can be sent in MsgA. The control information may be included in the MAC PDU of the MsgA. The control information may include one or more of connection request indication, connection resume request indication, SI request indication, buffer status indication, beam information (e.g., one or more DL TX beam ID(s) or SSB ID(s)), BFR indication/information, data indicator, cell/BS/TRP switching indication, connection re-establishment indication, reconfiguration complete or handover complete message, etc.

2 step CFRA: In this case, a gNB assigns, to a UE, dedicated RA preamble (s) and PUSCH resource(s) for MsgA transmission. RO(s) to be used for preamble transmission may also be indicated. In the first step, UE transmits RA preamble on PRACH and a payload on PUSCH using the CFRA resources (i.e., dedicated preamble/PUSCH resource/RO). In the second step, after MsgA transmission, the UE monitors for a response from the network (i.e., a gNB) within a configured window. The response is also referred as MsgB.

A gNB transmits the MsgB on a PDSCH. PDCCH scheduling the PDSCH carrying MsgB is addressed to an MSGB-RNTI. The MSGB-RNTI identifies the time-frequency resource (also referred as physical PRACH occasion or PRACH TX occasion or RACH occasion) in which an RA preamble was detected by the gNB. The MSGB-RNTI may be calculated as described above.

If the UE receives a PDCCH addressed to the C-RNTI, the RA procedure is considered successfully completed. If the UE receives fallback information corresponding to its transmitted preamble, the RA procedure is considered successfully completed.

For certain events such has handover and BFR, if dedicated preamble(s) and PUSCH resource(s) are assigned to the UE, during first step of RA, i.e., during RA resource selection for MsgA transmission, the UE determines whether to transmit a dedicated preamble or a non-dedicated preamble. The dedicated preamble is typically provided for a subset of SSBs/CSI-RSs. If there is no SSB/CSI RS having a DL RSRP above a threshold amongst the SSBs/CSI-RSs for which CFRA resources (i.e., dedicated preambles/ROs/PUSCH resources) are provided by the gNB, the UE selects the non-dedicated preamble. Otherwise, the UE selects the dedicated preamble. During the RA procedure, one RA attempt can be a 2 step CFRA, while other RA attempt can be a 2 step CBRA.

Upon initiation of an RA procedure, the UE first selects the carrier (e.g., SUL or NUL). If the carrier to use for the RA procedure is explicitly signaled by the gNB, the UE selects the signaled carrier for performing the RA procedure. If the carrier to use for the RA procedure is not explicitly signaled by the gNB, and if the Serving Cell for the RA procedure is configured with an SUL and if the RSRP of the downlink pathloss reference is less than rsrp-ThresholdSSB-SUL, the UE selects the SUL carrier for performing the RA procedure. Otherwise, the UE selects the NUL carrier for performing the RA procedure.

Upon selecting the UL carrier, the UE determines the UL and DL BWP for the RA procedure. The UE then determines whether to perform 2 step or 4 step RACH for this RA procedure.

If this RA procedure is initiated by a PDCCH order and if the ra-PreambleIndex explicitly provided by the PDCCH is not 0b000000, the UE selects 4 step RACH.

else if 2 step CFRA resources are signaled by the gNB for this RA procedure, the UE selects 2 step RACH.

else if 4 step CFRA resources are signaled by the gNB for this RA procedure, the UE selects 4 step RACH.

else if the UL BWP selected for this RA procedure is configured with only 2 step RACH resources, the UE selects 2 step RACH.

else if the UL BWP selected for this RA procedure is configured with only 4 step RACH resources, the UE selects 4 step RACH.

else if the UL BWP selected for this RA procedure is configured with both 2 step and 4 step RACH resources, if RSRP of the downlink pathloss reference is below a configured threshold, the UE selects 4 step RACH. Otherwise, the UE selects 2 step RACH.

BWP operation in 5G wireless communication system: In a 5G wireless communication system, bandwidth adaptation (BA) is supported. With BA, the receive and transmit bandwidth of a UE need not be as large as the bandwidth of the cell and can be adjusted. For example, the width can be ordered to change (e.g., to shrink during period of low activity to save power), the location can move in the frequency domain (e.g., to increase scheduling flexibility), and the SCS can be ordered to change (e.g., to allow different services). A subset of the total cell bandwidth of a cell is referred to as a BWP. BA is achieved by configuring an RRC connected UE with BWP(s) and telling the UE which of the configured BWPs is currently the active one. When BA is configured, the UE only has to monitor a PDCCH on the one active BWP, i.e., it does not have to monitor the PDCCH on the entire DL frequency of the serving cell.

In an RRC connected state, the UE is configured with one or more DL and UL BWPs, for each configured serving cell (i.e., a PCell or an SCell).

For an activated serving cell, there is one active UL and DL BWP at any point in time. The BWP switching for a serving cell is used to activate an inactive BWP and deactivate an active BWP at a time. The BWP switching is controlled by the PDCCH indicating a downlink assignment or a UL grant, by the bwp-InactivityTimer, by RRC signaling, or by the MAC entity itself upon initiation of an RA procedure.

Upon addition of SpCell or activation of an SCell, the DL BWP and UL BWP indicated by firstActiveDownlinkBWP-Id and firstActiveUplinkBWP-Id, respectively, is active without receiving a PDCCH indicating a downlink assignment or a UL grant. The active BWP for a Serving Cell is indicated by either RRC or PDCCH.

For unpaired spectrum, a DL BWP is paired with a UL BWP, and BWP switching is common for both UL and DL. Upon expiry of BWP inactivity timer, a UE switches to the active DL BWP to the default DL BWP or initial DL BWP (if default DL BWP is not configured).

In a 5G wireless communication system, an RRC can be in one of an RRC_IDLE state, an RRC_INACTIVE state, or an RRC_CONNECTED state. A UE is either in the RRC-_CONNECTED state or in RRC_INACTIVE state when an RRC connection has been established. If this is not the case, i.e. no RRC connection is established, the UE is in the RRC_IDLE state.

In the RRC_IDLE state, a UE specific DRX may be configured by upper layers. The UE monitors short messages transmitted with a paging radio network temporary identifier (P-RNTI) over DCI, monitors a paging channel for a CN paging using 5G-S-temporary mobile subscriber identity (5G-S-TMSI), performs neighboring cell measurements and cell (re-)selection, acquires SI and can send SI request (if configured), and performs logging of available measurements together with location and time for logged measurement configured UEs.

In the RRC_INACTIVE state, a UE specific DRX may be configured by upper layers or by RRC layer. The UE stores the UE inactive access stratum (AS) context. A RAN-based notification area is configured by RRC layer. The UE monitors short messages transmitted with a P-RNTI over DCI, monitors a paging channel for a CN paging using a 5G-S-TMSI and a RAN paging using full-RNTI, performs neighboring cell measurements and cell (re-)selection, performs RAN-based notification area updates periodically and when moving outside the configured RAN-based notification area, acquires SI and can send SI request (if configured), and performs logging of available measurements together with location and time for logged measurement configured UEs.

In the RRC_CONNECTED state, the UE stores the AS context and transfer of unicast data to/from UE takes place. The UE monitors short messages transmitted with a P-RNTI over DCI, if configured, monitors control channels associated with the shared data channel to determine if data is scheduled for it, provides channel quality and feedback information, performs neighboring cell measurements and measurement reporting, and acquires SI.

SI acquisition in 5G wireless communication system: In a 5G wireless communication system, a gNB or base station in cell broadcast synchronization signal and a physical broadcast channel (PBCH) block (SSB) consists of a primary synchronization signal (PSS) and a secondary synchronization signal (SSS) and SI. SI includes common parameters to communicate in a cell. In a 5G wireless communication system (also referred as next generation radio or NR), SI is divided into the master information block (MIB) and a number of SI blocks (SIBs) where:

the MIB is always transmitted on the broadcast channel (BCH) with a periodicity of 80 ms and repetitions made within 80 ms, and includes parameters to acquire SIB1 from the cell.

the SIB1 is transmitted on the downlink shared channel (DL-SCH) with a periodicity of 160 ms and variable transmission repetition. The default transmission repetition periodicity of SIB1 is 20 ms, but the actual transmission repetition periodicity is up to network implementation. The scheduling information in SIB 1 includes mapping between SIBs and SI messages, periodicity of each SI message, and SI window length. The scheduling information in SIB 1 includes an indicator for each SI message, which indicates whether the concerned SI message is being broadcasted or not. If at least one SI message is not being broadcasted, SIB1 may include RA resources (e.g., PRACH preamble(s) and PRACH resource(s)) for requesting the gNB to broadcast one or more SI message(s).

SIBs other than SIB1 are carried in SI messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with an SI-window and the SI-windows of different SI messages do not overlap. That is, within one SI-window, only the corresponding SI message is transmitted. Any SIB, except SIB1, can be configured to be cell specific or area specific, using an indication in SIB1. The cell specific SIB is applicable only within a cell that provides the SIB while the area specific SIB is applicable within an area referred to as an SI area, which includes one or more cells and is identified by systemInformation-AreaID.

A PDCCH in a 5G wireless communication system: In a 5G wireless communication system, a PDCCH is used to schedule DL transmissions on a PDSCH and UL transmissions on a PUSCH, where the DCI on PDCCH includes: Downlink assignments containing at least modulation and coding format, resource allocation, and hybrid-automatic repeat request (HARQ) information related to DL-SCH; UL scheduling grants containing at least modulation and coding format, resource allocation, and HARQ information related to UL shared channel (UL-SCH).

In addition to scheduling, a PDCCH can be used to for: activation and deactivation of configured PUSCH transmission with configured grant; activation and deactivation of PDSCH semi-persistent transmission; notifying one or more UEs of the slot format; notifying one or more UEs of the physical resource block(s) (PRB(s)) and OFDM symbol(s) where the UE may assume no transmission is intended for the UE; transmission of transmission power control (TPC) commands for physical UL control channel (PUCCH) and PUSCH; transmission of one or more TPC commands for sounding reference signal (SRS) transmissions by one or more UEs; switching a UE's active BWP; and initiating an RA procedure.

A UE monitors a set of PDCCH candidates in the configured monitoring occasions in one or more configured control resource sets (CORESETs) according to the corresponding search space configurations. A CORESET includes a set of PRBs with a time duration of 1 to 3 OFDM symbols. The resource units, e.g., resource element groups (REGs) and control channel elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for a PDCCH. Each resource element group carrying a PDCCH carries its own demodulation reference signal (DMRS). Quadrature phase shift keying (QPSK) modulation may be used for a PDCCH.

In a 5G wireless communication system, a list of search space configurations is signaled by a gNB for each configured BWP of a serving cell, wherein each search configuration is uniquely identified by a search space identifier. Search space identifier is unique amongst the BWPs of a serving cell. Identifier of search space configuration to be used for a specific purpose such as paging reception, SI reception, or RA response reception may be explicitly signaled by a gNB for each configured BWP. In NR, a search space configuration comprises of parameters such as Monitoring-periodicity-PDCCH-slot, Monitoring-offset-PDCCH-slot, Monitoring-symbols-PDCCH-within-slot and duration. A UE determines PDCCH monitoring occasion(s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). The PDCCH monitoring occasions are in slots 'x' to x+duration, where the slot with number 'x' in a radio frame with number 'y' satisfies the equation 1 below:

$$(y*(\text{number of slots in a radio frame})+x-\text{Monitoring-offset-PDCCH-slot}) \bmod (\text{Monitoring-periodicity-PDCCH-slot})=0 \quad \text{[Equation 1]}$$

The starting symbol of a PDCCH monitoring occasion in each slot having a PDCCH monitoring occasion is given by Monitoring-symbols-PDCCH-within-slot. The length (in symbols) of a PDCCH monitoring occasion is given in the CORESET associated with the search space. A search space configuration includes the identifier of CORESET configuration associated with it. A list of CORESET configurations are signaled by a gNB for each configured BWP of serving cell, wherein each CORESET configuration is uniquely identified by a CORESET identifier. A CORESET identifier is unique amongst the BWPs of a serving cell. Each radio frame is of 10 ms duration. A radio frame is identified by a radio frame number or system frame number. Each radio frame comprises several slots, wherein the number of slots in a radio frame and duration of slots depends on SCS. The number of slots in a radio frame and duration of slots depends radio frame for each supported SCS is pre-defined in NR. Each CORESET configuration is associated with a list of Transmission configuration indicator (TCI) states. One DL reference signal (RS) ID (e.g., an SSB or channel state information (CSI)-RS) is configured per TCI state. The list of TCI states corresponding to a CORESET configuration is signaled by gNB via RRC signaling. One TCI state in the TCI state list is activated and indicated to a UE by a gNB. The TCI state indicates the DL Tx beam (i.e., a DL Tx beam is quasi collocated (QCLed) with an SSB/CSI-RS of the TCI state) used by the gNB for transmission of a PDCCH in the PDCCH monitoring occasions of a search space.

In a 5G wireless communication system, the PDCCH monitoring activity of the UE in an RRC connected mode is governed by DRX, BA, and DCP (i.e., DCI with a CRC scrambled by a PS-RNTI). When DRX is configured, the UE does not have to continuously monitor a PDCCH. DRX is characterized by the following:

on-duration: duration that the UE waits for, after waking up, to receive PDCCHs. If the UE successfully decodes a PDCCH, the UE stays awake and starts the inactivity timer;

inactivity-timer: duration that the UE waits to successfully decode a PDCCH, from the last successful decoding of a PDCCH, failing which it can go back to sleep. The UE shall restart the inactivity timer following a single successful decoding of a PDCCH for a first transmission only (i.e., not for retransmissions);

retransmission-timer: duration until a retransmission can be expected;

cycle: specifies the periodic repetition of the on-duration followed by a possible period of inactivity;

active-time: total duration that the UE monitors a PDCCH. This includes the "on-duration" of the DRX cycle, the time UE is performing continuous reception while the inactivity timer has not expired, and the time when the UE is performing continuous reception while waiting for a retransmission opportunity.

A 5G or next generation radio access network (NG-RAN) based on NR consists of NG-RAN nodes, where an NG-RAN node is a gNB, providing NR user plane and control plane protocol terminations towards the UE. The gNBs are also connected by means of the NG interfaces to the 5GC; more specifically, to an access and mobility management function (AMF) through the NG-C interface and to a user plane function (UPF) through the NG-U interface.

In a 5G wireless communication system, the UE may use DRX in an RRC_IDLE state and an RRC_INACTIVE state in order to reduce power consumption. In the RRC_IDLE/RRC_INACTIVE state, the UE wake ups at regular intervals (i.e., every DRX cycle) for short periods to receive paging, to receive SI update notifications and emergency notifications.

A paging message is transmitted using a PDSCH. A PDCCH is addressed to a P-RNTI if there is a paging message in the PDSCH. The P-RNTI is common for all UEs. A UE identity (i.e., an S-TMSI for RRC_IDLE UE or I-RNTI for RRC_INACTIVE UE) is included in a paging message to indicate paging for a specific UE. A paging message may include multiple UE identities to page multiple UEs. A paging message is broadcasted (i.e., a PDCCH is masked with a P-RNTI) over a data channel (i.e., a PDSCH). SI updates and emergency notifications are included in DCI and a PDCCH carrying this DCI is addressed to a P-RNTI.

In the RRC idle/inactive mode, the UE monitors one paging occasion (PO) every DRX cycle. In the RRC idle/inactive mode, the UE monitors a PO in an initial DL BWP. In an RRC connected state, the UE monitors one or more POs to receive an SI update notification and to receive emergency notifications. In an RRC connected state, the UE can monitor any PO in a paging DRX cycle and monitor at least one PO in an SI modification period. In the RRC idle/inactive mode, the UE monitors a PO every DRX cycle in its active DL BWP. A PO is a set of 'S' PDCCH monitoring occasions for paging, where 'S' is the number of transmitted SSBs in a cell. The UE first determines the paging frame (PF) and then determines the PO with respect to the determined PF. One PF is a radio frame (10 ms).

EMBODIMENT 1

FIG. 1 illustrates a DRX cycle in accordance with an embodiment.

Referring to FIG. 1, an RRC controls DRX operation by configuring the following parameters:

drx-onDurationTimer: the duration at the beginning of a DRX cycle;

drx-SlotOffset: the delay before starting the drx-onDurationTimer;

drx-InactivityTimer: the duration after the PDCCH occasion in which a PDCCH indicates a new UL or DL transmission for the MAC entity;

drx-RetransmissionTimerDL (per DL HARQ process except for the broadcast process): the maximum duration until a DL retransmission is received;

drx-RetransmissionTimerUL (per UL HARQ process): the maximum duration until a grant for UL retransmission is received;

drx-LongCycleStartOffset: the Long DRX cycle and drx-StartOffset which defines the subframe where the Long and Short DRX cycle starts;

drx-ShortCycle (optional): the Short DRX cycle;

drx-ShortCycleTimer (optional): the duration the UE shall follow the Short DRX cycle;

drx-HARQ-RTT-TimerDL (per DL HARQ process except for the broadcast process): the minimum duration before a DL assignment for HARQ retransmission is expected by the MAC entity; and drx-HARQ-RTT-TimerUL (per UL HARQ process): the minimum duration before a UL HARQ retransmission grant is expected by the MAC entity.

When BA is configured, the UE only has to monitor a PDCCH on the one active BWP, i.e., it does not have to monitor the PDCCH on the entire DL frequency of the cell. A BWP inactivity timer, which is independent from the DRX inactivity-timer described above, is used to switch the active BWP to a default one. The timer is restarted upon successful PDCCH decoding and the switch to the default BWP takes place when it expires.

In addition, the UE may be indicated, when configured accordingly, whether it is required to monitor or not the PDCCH during the next occurrence of the on-duration by a DCP monitored on the active BWP. If the UE does not detect a DCP on the active BWP, it does not monitor the PDCCH during the next occurrence of the on-duration, unless it is explicitly configured to do so. A UE can only be configured to monitor DCP when connected mode DRX is configured, and at occasion(s) at a configured offset (i.e., a ps_offset) before the on-duration. More than one monitoring occasion can be configured before the on-duration. The UE does not monitor a DCP on occasions occurring during an active-time, measurement gaps, BWP switching, or when it monitors response for a CFRA preamble transmission for BFR, in which case it monitors the PDCCH during the next on-duration. If no DCP is configured in the active BWP, the UE follows a normal DRX operation. When CA is configured, DCP is only configured on the PCell. One DCP can be configured to control PDCCH monitoring during an on-duration for one or more UEs independently.

A UE configured with DRX mode operation can be configured with following parameters for DCP monitoring on an SpCell:

a PS-RNTI for DCI format 2_6 by ps-RNTI a number of search space sets, by dci-Format2-6, to monitor PDCCH for detection of DCI format 2_ 6 on the active DL BWP of the PCell or of the SpCell according to a common search space a payload size for DCI format 2_6 by SizeDCI_2-6 a location in DCI format 2_6 of a Wake-up indication bit by PSPositionDCI2-6, where:

the UE may not start the drx-onDurationTimer for the next long DRX cycle when a value of the Wake-up indication bit is '0', and the UE starts the drx-onDurationTimer for the next long DRX cycle when a value of the Wake-up indication bit is '1'.

an offset by ps-Offset indicating a time, where the UE starts monitoring PDCCH for detection of DCI format 2_6 according to the number of search space sets, prior to a slot where the drx-onDuarationTimer would start on the SpCell.

In the RRC_CONNECTED state, serving cells of a MAC entity may be configured by an RRC in two DRX groups with separate DRX parameters. A MAC entity is per cell group (CG). When the RRC does not configure a secondary DRX group in a CG, there is only one DRX group in that CG and all serving cells belong to that one DRX group. When two DRX groups are configured in a CG, each serving cell of a CG is uniquely assigned to either of the two groups. DRX parameters are categorized into group specific parameters and common parameters. The group specific parameters include drx-onDurationTimer and drx-InactivityTimer. The common parameters include drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

Figure 2:
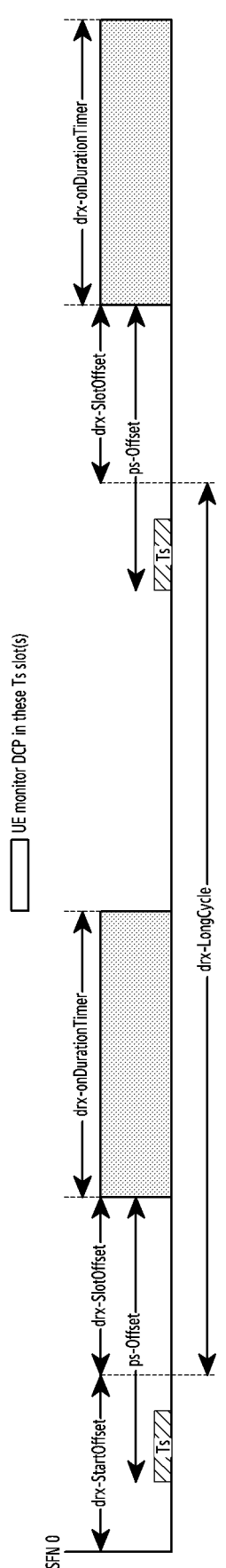
FIG. 2 illustrates a connected mode DRX operation in accordance with an embodiment.

FIG. 2 illustrates a connected mode DRX operation in accordance with an embodiment.

According to an Existing Connected Mode DRX Operation:

1> if the Short DRX Cycle is used, and [(SFN*10)+ subframe number] modulo (drx-ShortCycle)=(drx-StartOffset) modulo (drx-ShortCycle):

2> start drx-onDurationTimer after drx-SlotOffset from the beginning of the subframe.

1> if the Long DRX cycle is used for a DRX group, and [(SFN*10)+subframe number] modulo (drx-Long-Cycle)=drx-StartOffset:

if DCP monitoring is configured for the active DL BWP

3> if DCP indication associated with the current DRX cycle received from lower layer indicated to start drx-onDurationTimer 4> UE start drx-onDurationTimer after drx-SlotOffset from the beginning of the subframe.

2> else:

3> UE start drx-onDurationTimer after drx-SlotOffset from the beginning of the subframe.

An issue with the current procedure is that the DL packet arrival may not align with start of drx-onDurationTimer due to jitter. For certain services e.g., XR, DL traffic arrival has jitter which makes exact frame arrival timing random due to random delay contributed from frame encoders in an edge server, network transfer time in a CN, etc. If traffic arrives too early, then packets should be delayed until UE wakes up from a connected mode DRX off state, which increases the latency for the packet transmission. This can have a potentially negatively effect on the capacity given the tight packet delay budget (PDB) in DL. A DL burst arrives later than the expected time of arrival (where a DRX On duration start offset is configured), the UE should wait for a DL burst arrival while performing unnecessary PDCCH monitoring. The unnecessary PDCCH monitoring increases UE power consumption.

Accordingly, an enhanced method of connected mode DRX operation is needed.

Method 1-1

In this method of the disclosure, an 'offset' is introduced in DCP. A network, i.e., a gNB, signals an offset in DCI with CRC scrambled by PS-RNTI. Depending on the DL packet arrival, the network can adapt the starting time of on duration by signaling this 'offset' in DCP. The offset is for the current DRX cycle, i.e., cycle in which DCP is received. In Accordance with an Embodiment, a Method of a UE for DRX is as Follows:

1> if the Long DRX cycle is used for a DRX group, and [(SFN*10)+subframe number] modulo (drx-Long-Cycle)=drx-StartOffset:

2> if DCP monitoring is configured for the active DL BWP:

3> if DCP indication associated with the current DRX cycle indicated to start drx-onDurationTimer (i.e., a Wake-up indication bit is '1' in the received DCP):

4> If 'offset' is indicated in received DCP (or if DRX enhancement or DRX on duration timer start time adaptation is configured and if 'offset' is indicated in received DCP):

5> UE start drx-onDurationTimer after offset from the end of the slot in which DCP is received.

(Alternate: UE start drx-onDurationTimer after offset from the end of the last slot for monitoring DCP)

(Alternate: UE start drx-onDurationTimer after offset from the start of the last slot for monitoring DCP)

(Alternate: UE start drx-onDurationTimer after offset from the start of the first slot for monitoring DCP)

(Alternate: UE start drx-onDurationTimer after offset from the end of the first slot for monitoring DCP)

(Alternate: UE start drx-onDurationTimer after offset from the end of the subframe in which DCP is received)

(Alternate: UE start drx-onDurationTimer after offset from the beginning of subframe, here subframe is the subframe identified by subframe number in radio frame indicated by SFN which satisfies the equation in 1> i.e. [(SFN*10)+subframe number] modulo (drx-Long-Cycle)=drx-StartOffset)

4> Else (e.g. offset is not indicated in received DCP)

5> UE start drx-onDurationTimer after drx-SlotOffset from the beginning of the subframe (note that here subframe is the subframe identified by subframe number in radio frame indicated by SFN which satisfies the equation in 1>)

2> else:

3> UE start drx-onDurationTimer after drx-SlotOffset from the beginning of the subframe (note that here subframe is the subframe identified by subframe number in radio frame indicated by SFN which satisfies the equation in 1>).

An offset may be in units of slots. A slot length for an 'offset' may be determined based on SCS of an active DL BWP on which the UE monitors DCP. A slot length may be pre-defined for each SCS, e.g., a slot length is 1 ms for 15 KHz SCS, slot length is ½ milliseconds (ms) for 30 kHz SCS, slot length is ¼ ms for 60 kHz SCS, slot length is ⅛ ms for 120 kHz SCS, slot length is 1/16 ms for 240 kHz SCS, slot length is 1/32 ms for 480 kHz SCS, and slot length is 1/66 ms for 960 kHz SCS. A slot length for each SCS can also be signaled by a gNB in dedicated signaling (e.g. RRCReconfiguration message). The offset can be in units of OFDM symbols, subframes, frames, etc.

A set (or a list) of offset values can be indicated by a gNB in dedicated signaling (e.g., an RRCReconfiguration message). The list can be signaled per DL BWP or per cell or per CG or per DRX group. One of these values is selected by the gNB and indicated in DCI/DCP, e.g., by including an index of offset value in the set/list. For example, a set/list includes four offset values, offset A, offset B, Offset C, and Offset D. These offsets can be implicitly indexed sequentially in the order in which they appear in the set/list, i.e., the index of offset A is 0, index offset B is 1, index of offset C is 2, and index of offset D is 3. These offsets in set/list can be explicitly indexed by signaling index along with offset value.

The DCP may include multiple offsets wherein position (i.e., which offset amongst these offsets in DCI/DCP) of offset for UE can be indicated in dedicated signaling. For example, network can indicate that offset for UE is the $1^{st}$ (or $2^{nd}$ or $3^{rd}$ and so on) offset in DCP.

The UE may monitor DCI/DCP with the offset as explained above, when the UE performs DRX using a long DRX cycle. The UE may monitor DCI/DCP with the offset as explained above, irrespective of whether UE performs DRX using long DRX cycle or short DRX cycle. The UE may monitor DCI/DCP with an offset as explained above, only when UE performs DRX using short DRX cycle. Whether the UE monitors DCI/DCP with offset when the UE performs DRX using a long DRX cycle or a short DRX cycle is indicated by a gNB in dedicated signaling.

In addition to an offset, a gNB can also signal an on duration timer value in DCI/DCP. The UE applies this value in the current DRX cycle. In A set/list of on duration timer values can be indicated by the gNB in dedicated signaling (e.g., an RRCReconfiguration message). The list can be signaled per DL BWP, per cell, per CG, or per DRX group. One of these values is selected by the gNB and indicated in DCP/DCI, e.g., by including an index of on duration timer value in the set/list. For example, a set/list includes four on duration timer values, on duration timer A, on duration timer B, on duration timer C, and on duration timer D. These on duration timer values can be implicitly indexed sequentially in the order in which they appear in the set/list, such as the index of on duration timer A is 0, index on duration timer B is 1, index of on duration timer C is 2, and index of on duration timer D is 3. The on duration timers in set/list can be explicitly indexed by signaling index along with on duration timer value.

The DCP/DCI may include multiple on duration timers, wherein position of on duration timer for UE can be indicated in dedicated signaling. For example, a network can indicate that an on duration timer for the UE is the $1^{st}$ (or $2^{nd}$, $3^{rd}$, etc.) on duration timer in DCI/DCP.

A set/list of an on duration timer and offset values can be indicated by a gNB in dedicated signaling (e.g., an RRCReconfiguration message). The list can be signaled per DL BWP, per cell, per CG, or per DRX group. Each entry in the list includes an on duration timer value and an offset value. If for any entry, an offset value is absent, this means that an offset is not applied. If an on duration timer value is not signaled for an entry, the UE applies drx-onDuration-Timer in the DRX configuration. One entry is selected by a gNB and indicated in DCP/DCI, e.g., by including an index of an entry in the set/list. For example, a set/list includes four entries, which can be implicitly indexed sequentially in the order in which they appear in the set/list, such as the index of first entry is 0, index second entry is 1, index of third entry is 2, and index of fourth entry is 3. These entries in set/list can be explicitly indexed by signaling index for each entry in the list.

An offset may be indicated by two offsets in DCP/DCI, i.e., 'offset1' and 'offset 2'. When offset(s) are indicated in DCP/DCI, a UE starts drx-onDurationTimer after offset='offset 1 (in subframes)+offset 2 (in slots)' from the end of subframe in which DCP is received.

Whether DCP may include an offset, an on duration timer, etc., i.e., whether a network supports these in DCP, can be indicated by a gNB in dedicated signaling (e.g., an RRCReconfiguration message). This indication can be implicit (e.g., by configuration of candidate offsets or other parameters) or explicit. If network indicates that network supports offset in DCP, the UE may look for an offset, an on duration timer, etc., in the received DCP; otherwise, the UE does not look.

Figure 3:
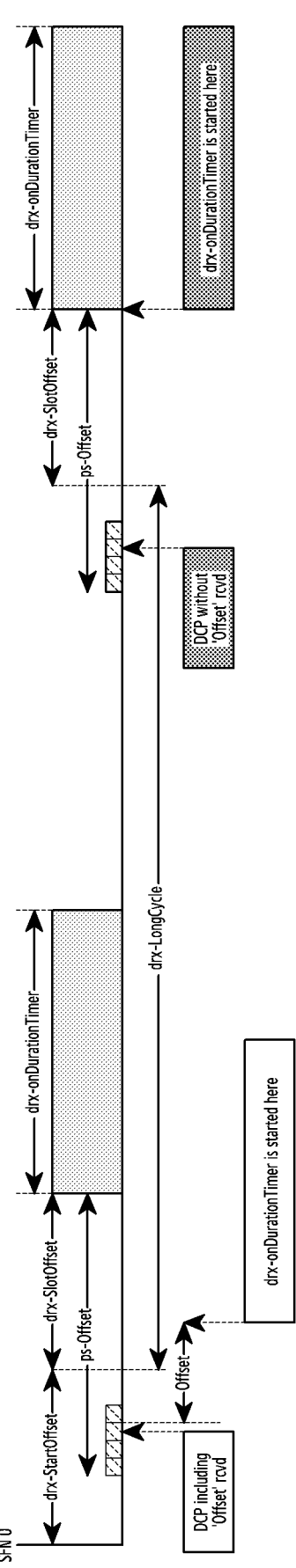
FIG. 3 illustrates a DCP in accordance with an embodiment.

FIG. 3 illustrates DCP in accordance with an embodiment, and FIG. 4 illustrates is a flow chart illustrating UE operations in accordance with an embodiment.

In step 400, Step 0, the UE receives the RRC Reconfiguration message including the DRX configuration(s) and DCP configuration/parameters as explained earlier.

In step 410, Step 1, the UE first identifies the subframe which satisfies [(SFN*10)+subframe number] modulo (drx-LongCycle)=drx-StartOffset. drx-LongCycle and drx-StartOffset are received in the RRC Reconfiguration message.

In step 420, Step 2, the UE then identifies/determines starting time of an on duration timer. The starting time of an on duration timer is at drx-SlotOffset from the beginning of the identified/determined (in step 410) subframe. drx-SlotOffset is received in the RRC Reconfiguration message.

In step 430, Step 3, from the identified/determined starting time of the on duration timer, the UE identifies/determines the starting of DCP monitoring. The DCP monitoring starts at ps-Offset prior to a slot from the identified/determined starting time of on duration timer. ps-Offset is received in the RRC Reconfiguration message.

In step 440, Step 4, the UE receives DCP in one of the slots monitored for DCP and the DCP indicates UE to start the on duration timer (i.e., wakeup indication bit for UE is set to 1). If the DCP includes an 'offset', the UE starts drx-onDurationTimer after the offset (in slots) from the end of the slot in which DCP is received (Alternate: UE start drx-onDurationTimer after offset from the end of the last slot for monitoring DCP; Alternate: UE start drx-onDuration-Timer after offset from the start of the last slot for monitoring DCP; Alternate: UE start drx-onDurationTimer after offset from the start of the first slot for monitoring DCP; Alternate: UE start drx-onDurationTimer after offset from the end of the first slot for monitoring DCP; Alternate: UE start drx-onDurationTimer after offset from the end of the subframe in which DCP is received; Alternate: UE start drx-onDurationTimer after offset from the beginning of subframe, here subframe is the subframe identified by sub-frame number in radio frame indicated by SFN which satisfies the equation in 1>).

If DCP does not include 'offset', the UE starts drx-onDurationTimer after drx-SlotOffset from the beginning of the subframe identified in step 410. The drx-onDuration-Timer is received in the RRC Reconfiguration message. If the DCP indicates an drx-onDurationTimer value, the UE starts drx-onDurationTimer of indicated value when starting this timer, otherwise, UE starts drx-onDurationTimer of the value configured in RRC Reconfiguration message (as in legacy for DRX group(s)).

Another Example Operation of the UE is as Follows:

In step 400, Step 0, the UE receives the RRC Reconfiguration message including the DRX configuration. The DRX adaptation parameter list (i.e. each entry in list consists of 'offset and on duration timer' and is indexed implicitly sequentially starting from first entry in list or explicitly by signaling index of each entry) and DCP configuration/parameters as explained above.

In step 410, Step 1, the UE identifies the subframe which satisfies [(SFN*10)+subframe number] modulo (drx-Long-Cycle)=drx-StartOffset. drx-LongCycle and drx-StartOffset are received in the RRC Reconfiguration message.

In step 420, Step 2, the UE identifies/determines a starting time of an on duration timer. The starting time of the on duration timer is at drx-SlotOffset from the beginning of the identified/determined (in step 410) subframe. The drx-Slo-tOffset is received in the RRC Reconfiguration message.

In step 430, Step 3, from the identified/determined starting time of the on duration timer, the UE identifies/deter-mines the starting of DCP monitoring. The DCP monitoring starts at ps-Offset prior to a slot from the identified/deter-mined starting time of on duration timer. The ps-Offset is received in the RRC Reconfiguration message.

In step 440, Step 4, the UE receives DCP in one of the slots monitored for DCP and the DCP indicates UE to start the on duration timer (i.e., a wakeup indication bit for UE is set to 1). If the DCP includes a DRX adaptation parameter list index, the UE starts DRX on duration timer of value corresponding to entry indicated by DRX adaptation param-eter list index after the offset (in slots) corresponding to entry indicated by DRX adaptation parameter list index from the end of the slot in which DCP is received (Alternate: UE starts DRX on duration timer of value corresponding to entry indicated by DRX adaptation parameter list index after offset corresponding to entry indicated by DRX adaptation parameter list index from the end of the last slot for monitoring DCP; Alternate: UE starts DRX on duration timer of value corresponding to entry indicated by DRX adaptation parameter list index after offset corresponding to entry indicated by DRX adaptation parameter list index from the start of the first slot for monitoring DCP; Alternate: UE starts DRX on duration timer of value corresponding to entry indicated by DRX adaptation parameter list index after offset corresponding to entry indicated by DRX adaptation parameter list index from the end of the first slot for monitoring DCP; Alternate: UE starts DRX on duration timer of value corresponding to entry indicated by DRX adaptation parameter list index after offset corresponding to entry indicated by DRX adaptation parameter list index from the beginning of subframe, here subframe is the subframe identified by subframe number in radio frame indicated by SFN which satisfies the equation in 1>).

If the DCP does not include an 'offset', the UE start drx-onDurationTimer after drx-SlotOffset from the beginning of the subframe identified in step 410. The drx-onDurationTimer is received in the RRC Reconfiguration message.

In Accordance with an Embodiment, UE Operations for DRX Include the Following:

1> if the Short DRX Cycle is used, and [(SFN*10)+subframe number] modulo (drx-ShortCycle)=(drx-StartOffset) modulo (drx-ShortCycle):

2> if DCP monitoring is configured for the active DL BWP (or if DCP monitoring is configured for the active DL BWP and if DRX enhancement or DRX on duration timer start time adaptation is configured):

3> if DCP indication associated with the current DRX cycle indicated to start drx-onDurationTimer 4> If 'offset' is indicated in received DCP:

5> The UE starts drx-onDurationTimer after offset from the end of the slot in which DCP is received.

(Alternate: The UE starts drx-onDurationTimer after offset from the end of the last slot for monitoring DCP)

(Alternate: The UE starts drx-onDurationTimer after offset from the start of the last slot for monitoring DCP)

(Alternate: The UE starts drx-onDurationTimer after offset from the start of the first slot for monitoring DCP)

(Alternate: The UE starts drx-onDurationTimer after offset from the end of the first slot for monitoring DCP)

4> Else (e.g., offset is not indicated in received DCP)

5> The UE starts drx-onDurationTimer after drx-SlotOffset from the beginning of the subframe. Here, the subframe is the subframe identified by subframe number in radio frame indicated by SFN which satisfies the equation in 1>.

2> else:

3> The UE starts drx-onDurationTimer after drx-SlotOffset from the beginning of the subframe. Here, the subframe is the subframe identified by subframe number in radio frame indicated by SFN which satisfies the equation in 1>.

Instead of DCP, another DCI scrambled by an RNTI (pre-defined or signaled in dedicated signaling) can be used to indicate offset (and/or other parameter as described in this method). For example, this DCI can be used if DCP is not configured or if UE is performing DRX using short DRX cycle. All other procedure explained above for DCP may be applied to this DCI. The PDCCH monitoring occasions (i.e., search space and CORESET) for monitoring this DCI can be signaled by a gNB in dedicated RRC signaling. A UE configured with a DRX mode operation can be configured with following parameters for monitoring this new DCI:

an X-RNTI for DCI format X by X-RNTI a number of search space sets, by dci-FormatX, to monitor PDCCH for detection of DCI format X on the active DL BWP of the PCell or of the SpCell according to a common search space a payload size for DCI format X by SizeDCI_X a location in DCI format X of a offset by OffsetPosition-DCI2-6 an offset by X-Offset indicating a time, where the UE starts monitoring a PDCCH for detection of DCI format X according to the number of search space sets, prior to a slot where the drx-onDuarationTimer would start.

In Accordance with an Embodiment, UE Operations for DRX Include the Following:

1> if the Short DRX Cycle is used, and [(SFN*10)+subframe number] modulo (drx-ShortCycle)=(drx-StartOffset) modulo (drx-ShortCycle):

2> if DRX enhancement or DRX on duration timer start time adaptation is configured:

3> if DCI (DCI format X) is received

4> If 'offset' is included in received DCI:

5> UE start drx-onDurationTimer after offset from the end of the slot in which DCP is received.

(Alternate: The UE starts drx-onDurationTimer after offset from the end of the last slot for monitoring DCI)

(Alternate: The UE starts drx-onDurationTimer after offset from the start of the last slot for monitoring DCI)

(Alternate: The UE starts drx-onDurationTimer after offset from the start of the first slot for monitoring DCI)

(Alternate: The UE starts drx-onDurationTimer after offset from the end of the first slot for monitoring DCI)

(Alternate: The UE starts drx-onDurationTimer after offset from the end of the subframe in which DCP is received)

(Alternate: The UE starts drx-onDurationTimer after offset from the beginning of subframe. Here, the subframe is the subframe identified by subframe number in radio frame indicated by SFN which satisfies the equation in 1>)

4> Else (e.g., offset is not included in received DCI)

5> The UE starts drx-onDurationTimer after drx-SlotOffset from the beginning of the subframe. Here, the subframe is the subframe identified by subframe number in radio frame indicated by SFN which satisfies the equation in 1>.

3> if DCI (DCI format X) is not received

4> The UE starts drx-onDurationTimer after drx-SlotOffset from the beginning of the subframe (here, the subframe is the subframe identified by subframe number in radio frame indicated by SFN which satisfies the equation in 1>)

2> else:

3> The UE starts drx-onDurationTimer after drx-SlotOffset from the beginning of the subframe (here, the subframe is the subframe identified by subframe number in radio frame indicated by SFN which satisfies the equation in 1>).

In Accordance with an Embodiment UE Operations for DRX Include the Following:

1> if the Long DRX cycle is used for a DRX group, and [(SFN*10)+subframe number] modulo (drx-Long-Cycle)=drx-StartOffset:

2> if DRX enhancement or DRX on duration timer start time adaptation is configured (or search space for DCI format X is configured):

3> if DCI (DCI format X) is received:

4> If 'offset' is indicated in received DCI:

5> The UE starts drx-onDurationTimer after offset from the end of the slot in which DCP is received.

(Alternate: The UEs start drx-onDurationTimer after offset from the end of the last slot for monitoring DCI)

(Alternate: The UE starts drx-onDurationTimer after offset from the start of the last slot for monitoring DCI)

(Alternate: The UE starts drx-onDurationTimer after offset from the start of the first slot for monitoring DCI)

(Alternate: The UE starts drx-onDurationTimer after offset from the end of the first slot for monitoring DCI)

(Alternate: The UE starts drx-onDurationTimer after offset from the end of the subframe in which DCP is received)

(Alternate: The UE starts drx-onDurationTimer after offset from the beginning of subframe. Here, subframe is the subframe identified by subframe number in radio frame indicated by SFN which satisfies the equation in 1>)

4> Else (e.g., offset is not indicated in received DCI)

5> The UE starts drx-onDurationTimer after drx-SlotOff-set from the beginning of the subframe (note that here subframe is the subframe identified by subframe number in radio frame indicated by SFN which satisfies the equation in 1>)

3> if DCI (DCI format X) is not received:

4> The UE starts drx-onDurationTimer after drx-SlotOff-set from the beginning of the subframe (note that here subframe is the subframe identified by subframe number in radio frame indicated by SFN which satisfies the equation in 1>)

2> else:

3> The UE starts drx-onDurationTimer after drx-SlotOff-set from the beginning of the subframe (here, the subframe is the subframe identified by subframe number in radio frame indicated by SFN which satisfies the equation in 1>).

Method 1-2

In this method of the disclosure an 'offset' is introduced in DCP. A network, i.e., a gNB, signals an offset in DCI with a CRC scrambled by a PS-RNTI. Depending on the DL packet arrival network can adapt the starting time of on duration by signaling this 'offset' in DCP. The offset is for the current DRX cycle, i.e., cycle in which DCP is received. The offset is also used as drx-SlotOffset for the subsequent DRX cycles until a DCP with a new offset is received.

In accordance with an embodiment, UE operations for DRX include the following:

The UE sets a variable DRX-SLOTOFFSET to drx-SlotOffset received in RRC signaling when DRX is configured. UE repeats the below procedure for every DRX cycle.

1> if the Long DRX cycle is used for a DRX group, and [(SFN*10)+subframe number] modulo (drx-Long-Cycle)=drx-StartOffset:

2> if DCP monitoring is configured for the active DL BWP:

3> if DCP indication associated with the current DRX cycle indicated to start drx-onDurationTimer (i.e., Wake-up indication bit is '1' in the received DCP):

4> If 'offset' is indicated in received DCP (or if DRX enhancement or DRX on duration timer start time adaptation is configured and if 'offset' is indicated in received DCP):

5> DRX-SLOTOFFSET is set to Offset received in DCP

5> The UE starts drx-onDurationTimer after DRX-SLO-TOFFSET from the beginning of subframe (here, the subframe is the subframe identified by subframe number in radio frame indicated by SFN which satisfies the equation in 1>i.e. [(SFN*10)+subframe number] modulo (drx-LongCycle)=drx-StartOffset)

4> Else (e.g. offset is not indicated in received DCP)

5> The UE starts drx-onDurationTimer after DRX-SLO-TOFFSET from the beginning of the subframe (here, the subframe is the subframe identified by subframe number in radio frame indicated by SFN which satisfies the equation in 1>)

2> else:

3> The UE starts drx-onDurationTimer after DRX-SLO-TOFFSET from the beginning of the subframe (here, the subframe is the subframe identified by subframe number in radio frame indicated by SFN which satisfies the equation in 1>).

The offset may be units of slots. A slot length for the 'offset' may be determined based on an SCS of an active DL BWP on which the UE monitors DCP. A slot length may be pre-defined for each SCS, e.g., a slot length is 1 ms for 15 kHz SCS, slot length is ½ ms for 30 kHz SCS, slot length is ¼ ms for 60 kHz SCS, slot length is ⅛ ms for 120 kHz SCS, slot length is 1/16 ms for 240 kHz SCS, slot length is 1/32 ms for 480 kHz SCS, and slot length is 1/96 ms for 960 kHz SCS. A slot length for each SCS can also be signaled by a gNB in dedicated signaling (e.g., an RRCReconfiguration message). The offset can be units of OFDM symbols, subframes, frames, etc.

A set/list of offset values can be indicated by a gNB in dedicated signaling (e.g., an RRCReconfiguration message). The list can be signaled per DL BWP or per cell or per CG or per DRX group. One of these values is selected by a gNB and indicated in DCI/DCP, e.g., by including an index of offset value in the set/list. For example, a set/list includes four offset values, offset A, offset B, Offset C, and Offset D. These offsets can be implicitly indexed sequentially in the order in which they appear in the set/list, i.e., the index of offset A is 0, index offset B is 1, index of offset C is 2, and index of offset D is 3. These offsets in set/list can be explicitly indexed by signaling index along with offset value.

DCP may include multiple offsets, wherein a position (i.e., which offset amongst these offsets in DCI/DCP) of offset for UE can be indicated in dedicated signaling. For example, the network can indicate that an offset for a UE is the $1^{st}$, $2^{nd}$, $3^{rd}$, etc., offset in the DCP.

The UE may monitor DCI/DCP with the offset as explained above, when the UE performs DRX using long DRX cycle. The UE may monitor DCI/DCP with offset as explained above, irrespective of whether UE performs DRX using long DRX cycle or short DRX cycle. The UE may monitor DCI/DCP with an offset as explained above, only when the UE performs DRX using short DRX cycle. Whether the UE monitors DCI/DCP with the offset as explained above, when UE performs DRX using long DRX cycle or short DRX cycle, may be indicated by a gNB through dedicated signaling.

In addition to an offset, a gNB can also signal an on duration timer value in DCI/DCP. The UE applies this value in the current DRX cycle and also subsequent DRX cycles until a new on duration timer is received in DCP/DCI. A set/list of on duration timer values can be indicated by a gNB in dedicated signaling (e.g., an RRCReconfiguration message). The list can be signaled per DL BWP, per cell, per CG, or per DRX group. One of these values is selected by a gNB and indicated in DCP/DCI, e.g., by including an index of an on duration timer value in the set/list. For example, a set/list includes four on duration timer values, on duration timer A, on duration timer B, on duration timer C, and on duration timer D. These on duration timer values can be implicitly indexed sequentially in the order in which they appear in the set/list, e.g., the index of on duration timer A is 0, index on duration timer B is 1, index of on duration timer C is 2, and index of on duration timer D is 3. These on duration timers in set/list can be explicitly indexed by signaling index along with on duration timer value.

DCP/DCI may include multiple on duration timers, wherein a position of on duration timer for UE can be indicated in dedicated signaling. For example, the network can indicate that an on duration timer for a UE is the $1^{st}$, $2^{nd}$, $3^{rd}$, etc., on duration timer in DCI/DCP.

A set/list of on duration timer and offset values can be indicated by a gNB in dedicated signaling (e.g., an RRCReconfiguration message). The list can be signaled per DL BWP, per cell, per CG, or per DRX group. Each entry in the list includes an on duration timer value and an offset value. If an offset value is absent for any entry, this means that offset is not applied. If an on duration timer value is not signaled for an entry, the UE applies drx-onDurationTimer in DRX configuration. One entry is selected by a gNB and indicated in DCP/DCI, e.g., by including an index of an entry in the set/list. For example, a set/list includes four entries, which can be implicitly indexed sequentially in the order in which they appear in the set/list, e.g., the index of first entry is 0, index second entry is 1, index of third entry is 2, and index of fourth entry is 3. These entries in set/list can be explicitly indexed by signaling index for each entry in the list.

Whether DCP may include an 'offset, an on duration timer, etc., i.e., whether a network supports these in DCP, can be indicated by a gNB in dedicated signaling (e.g., an RRCReconfiguration message). This indication can be implicit (e.g., by configuration of candidate offsets or other parameters) or explicit. If the network indicates that it supports an offset in DCP, the UE may look for offset, an on duration timer, etc., in the received DCP; otherwise, the UE does not look.

Figure 5A:
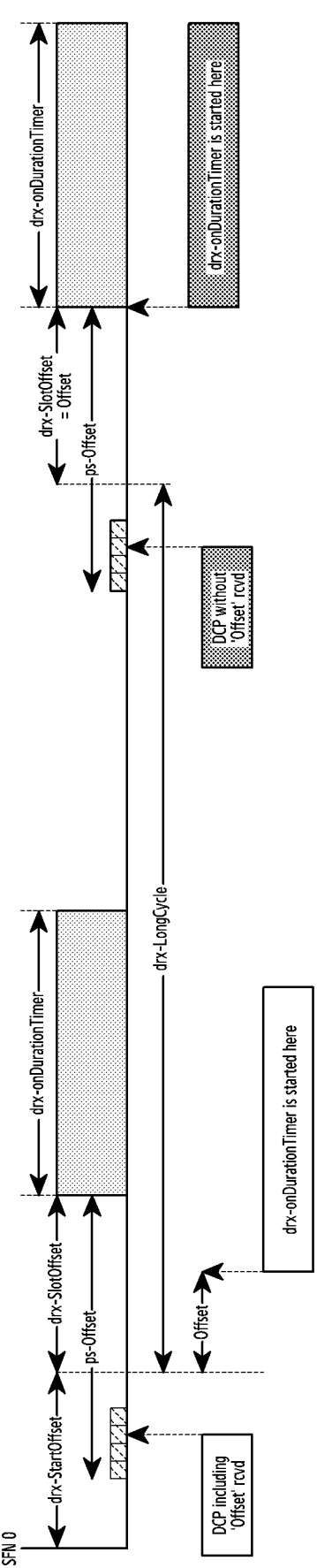
FIG. 5A illustrates a DCP in accordance with an embodiment.
Figure 5B:
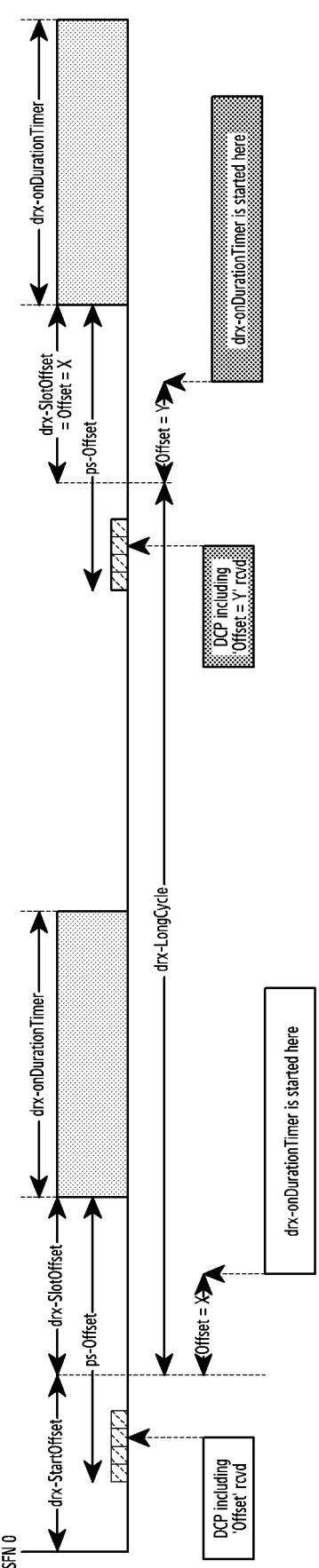
FIG. 5B illustrates a DCP in accordance with an embodiment.

FIG. 5A and FIG. 5B illustrate DCP in accordance with embodiments.

FIG. 6 is a flow chart illustrating UE operations according to an embodiment.

Referring to FIG. 6, in step 600, Step 0, the UE receives the RRC Reconfiguration message including the DRX configuration(s) and DCP configuration/parameters as explained earlier.

In step 610, Step 1, the UE identifies the subframe which satisfies [(SFN*10)+subframe number] modulo (drx-Long-Cycle)=drx-StartOffset. drx-LongCycle and drx-StartOffset are received in the RRC Reconfiguration message.

In step 620, Step 2, the UE identifies/determines starting time of an on duration timer. The starting time of the on duration timer is at drx-SlotOffset from the beginning of the identified/determined subframe. The drx-SlotOffset is received in the RRC Reconfiguration message.

In step 630, Step 3, from the identified/determined starting time of the on duration timer, the UE identifies/determines the starting of DCP monitoring. The DCP monitoring starts at ps-Offset prior to a slot from the identified/determined starting time of on duration timer. The ps-Offset is received in the RRC Reconfiguration message.

In step 640, Step 4, the UE receives DCP in one of the slots monitored for DCP and DCP indicates (i.e., wakeup indication bit for UE is set to 1) UE to start the on duration timer. If DCP includes 'offset', the UE starts drx-onDurationTimer after offset from the beginning of subframe identified in step 1>. If DCP does not include 'offset', the UE starts drx-onDurationTimer after drx-SlotOffset from the beginning of the subframe identified in step 1>. The drx-onDurationTimer is received in the RRC Reconfiguration message. If DCP indicates drx-onDurationTimer value, the UE starts drx-onDurationTimer of indicated value when starting this timer; otherwise, the UE starts drx-onDuration-Timer of the value configured in RRC Reconfiguration message (as in legacy for DRX group(s)).

In step 650, Step 5, for next DRX cycle(s), the UE repeats the step 610 to 640, wherein in step 620 and step 640, the drx-SlotOffset is the latest received DRX slot offset from the gNB (it can be offset in DCP or drx-SlotOffset in RRC Reconfiguration message whichever is latest received).

Another Example of Operation at UE According to an Embodiment is as Follows:

0. The UE receives the RRC Reconfiguration message including the DRX configuration(s) and DCP configuration/parameters as explained above. The UE then perform the following for each DRX cycle:

1. The UE identifies the subframe which satisfies [(SFN*10)+subframe number] modulo (drx-Long-Cycle)=drx-StartOffset. drx-LongCycle and drx-Start-Offset are received in the RRC Reconfiguration message 2. The UE identifies/determines starting time of on duration timer, starting time of on duration timer is at drx-SlotOffset from the beginning of the identified/determined (in step 1) subframe. drx-SlotOffset is the latest received DRX slot offset from gNB (it can be offset in DCP or drx-SlotOffset in RRC Reconfiguration message whichever is latest received).

3. From the identified/determined (in step 2) starting time of the on duration timer, the UE identifies/determines the starting of DCP monitoring. The DCP monitoring starts at ps-Offset prior to a slot from the identified/determined (in step 2) starting time of on duration timer. The ps-Offset is received in the RRC Reconfiguration message.

4. The UE receives DCP in one of the slots monitored for DCP and DCP indicates (i.e., wakeup indication bit for UE is set to 1) the UE to start the on duration timer.

If DCP includes an 'offset', the UE starts drx-onDurationTimer after offset from the beginning of subframe identified in step 1>.

If the DCP does not include the 'offset', the UE starts drx-onDurationTimer after drx-SlotOffset from the beginning of the subframe (identified in step 1>). The drx-SlotOffset is the latest received DRX slot offset from the gNB (it can be offset in DCP or drx-SlotOffset in RRC Reconfiguration message whichever is latest received).

drx-onDurationTimer is received in the RRC Reconfiguration message. If DCP indicates a drx-onDurationTimer value, the UE starts drx-onDurationTimer of the indicated value when starting the timer; otherwise, the UE starts the drx-onDurationTimer of the value configured in an RRC Reconfiguration message (as in legacy for DRX group(s)).

A UE Operation for DRX is as Follows:

The UE sets a variable DRX-SLOTOFFSET to drx-SlotOffset received in RRC signaling when DRX is configured. The UE repeats the below procedure for every DRX cycle.

1> if the Short DRX Cycle is used, and [(SFN*10)+subframe number] modulo (drx-ShortCycle)=(drx-StartOffset) modulo (drx-ShortCycle):

2> if DCP monitoring is configured for the active DL BWP (or if DCP monitoring is configured for the active DL BWP and if DRX enhancement or DRX on duration timer start time adaptation is configured):

3> if DCP indication associated with the current DRX cycle indicated to start drx-onDurationTimer (i.e. Wake-up indication bit is '1' in the received DCP):

4> If 'offset' is indicated in received DCP (or if DRX enhancement or DRX on duration timer start time adaptation is configured and if 'offset' is indicated in received DCP):

5> DRX-SLOTOFFSET is set to Offset received in DCP

5> The UE starts drx-onDurationTimer after DRX-SLO-TOFFSET from the beginning of subframe (here, the subframe is the subframe identified by subframe number in radio frame indicated by SFN which satisfies the equation in 1> i.e. [(SFN*10)+subframe number] modulo (drx-LongCycle)=drx-StartOffset)

4> Else (e.g. offset is not indicated in received DCP):

5> The UE starts drx-onDurationTimer after DRX-SLO-TOFFSET from the beginning of the subframe (here, the subframe is the subframe identified by subframe number in radio frame indicated by SFN which satisfies the equation in 1>)

2> else:

3> The UE starts drx-onDurationTimer after DRX-SLO-TOFFSET from the beginning of the subframe (here, the subframe is the subframe identified by subframe number in radio frame indicated by SFN which satisfies the equation in 1>).

Instead of DCP, another DCI scrambled by an RNTI (pre-defined or signaled in dedicated signaling) can be used to indicate an offset (and/or other parameter as described in this method). The DCI can be used if DCP is not configured or if the UE is performing DRX using short DRX cycle. All other procedure explained above for DCP may be applied to this DCI. The PDCCH monitoring occasions (i.e., search space and CORESET) for monitoring this DCI can be signaled by a gNB in dedicated RRC signaling. A UE configured with DRX mode operation can be configured with following parameters for monitoring this new DCI:

a X-RNTI for DCI format X by X-RNTI:
  a number of search space sets, by dci-FormatX, to monitor PDCCH for detection of DCI format X on the active DL BWP of the PCell or of the SpCell according to a common search space
  a payload size for DCI format X by SizeDCI_X
  a location in DCI format X of a offset by OffsetPositionDCI2-6
 an offset by X-Offset indicating a time, where the UE starts monitoring a PDCCH for detection of DCI format X according to the number of search space sets, prior to a slot where the drx-onDuarationTimer would start.

UE Operations for DRX Include the Following:

The UE sets a variable DRX-SLOTOFFSET to drx-SlotOffset received in RRC signaling when DRX is configured. The UE repeats the below procedure for every DRX cycle.

1> if the Short DRX Cycle is used, and [(SFN*10)+subframe number] modulo (drx-ShortCycle)=(drx-StartOffset) modulo (drx-ShortCycle):

2> if DRX enhancement or DRX on duration timer start time adaptation is configured:

3> if DCI (DCI format X) is received

4> If 'offset' is included in received DCI:

5> DRX-SLOTOFFSET is set to Offset received in DCP

5> The UE starts drx-onDurationTimer after DRX-SLO-TOFFSET from the beginning of subframe (here, the subframe is the subframe identified by subframe number in radio frame indicated by SFN which satisfies the equation in 1> i.e. [(SFN*10)+subframe number] modulo (drx-LongCycle)=drx-StartOffset)

4> Else (e.g. offset is not indicated in received DCP):

5> The UE starts drx-onDurationTimer after DRX-SLO-TOFFSET from the beginning of the subframe (here, the subframe is the subframe identified by subframe number in radio frame indicated by SFN which satisfies the equation in 1>)

3> if DCI (DCI format X) is not received

4> The UE starts drx-onDurationTimer after DRX-SLO-TOFFSET from the beginning of the subframe (here, the subframe is the subframe identified by subframe number in radio frame indicated by SFN which satisfies the equation in 1>)

2> else:

3> The UE starts drx-onDurationTimer after DRX-SLO-TOFFSET from the beginning of the subframe (here, the subframe is the subframe identified by subframe number in radio frame indicated by SFN which satisfies the equation in 1>).

UE Operations for DRX Include the Following:

The UE sets a variable DRX-SLOTOFFSET to drx-SlotOffset received in RRC signaling when DRX is configured. The UE repeats the below procedure for every DRX cycle.

1> If the Long DRX cycle is used for a DRX group, and [(SFN*10)+subframe number] modulo (drx-LongCycle)=drx-StartOffset:

2> If DRX enhancement or DRX on duration timer start time adaptation is configured (or search space for DCI format X is configured):

3> If DCI (DCI format X) is received:

4> If an 'offset' is indicated in received DCI:

5> DRX-SLOTOFFSET is set to Offset received in DCP

5> The UE starts drx-onDurationTimer after DRX-SLO-TOFFSET from the beginning of subframe (here, the subframe is the subframe identified by subframe number in radio frame indicated by SFN which satisfies the equation in 1> i.e. [(SFN*10)+subframe number] modulo (drx-LongCycle)=drx-StartOffset)

4> Else (e.g., an offset is not indicated in received DCP)

5> The UE starts drx-onDurationTimer after DRX-SLO-TOFFSET from the beginning of the subframe (here, the subframe is the subframe identified by subframe number in radio frame indicated by SFN which satisfies the equation in 1>)

3> if DCI (DCI format X) is not received:

4> The UE starts drx-onDurationTimer after DRX-SLO-TOFFSET from the beginning of the subframe (here, the subframe is the subframe identified by subframe number in radio frame indicated by SFN which satisfies the equation in 1>)

2> else:

3> The UE starts drx-onDurationTimer after drx-SlotOffset from the beginning of the subframe (here, the subframe is the subframe identified by subframe number in radio frame indicated by SFN which satisfies the equation in 1>).

Another example of UE operations is explained below (drx-StartOffset and drx-SlotOffset can be signaled in DCP, drx-SlotOffset is applied from current DRX cycle for starting on duration timer, drx-StartOffset is applied from next DRX cycle):

Step 0. The UE receives the RRC Reconfiguration message including the DRX configuration(s) and DCP configuration/parameters as explained earlier. UE then perform the following for each DRX cycle:

Step 1. The UE identifies the subframe which satisfies [(SFN*10)+subframe number] modulo (drx-LongCycle)=drx-StartOffset. drx-LongCycle is received in the RRC Reconfiguration message. The drx-StartOffset is the latest received DRX start offset from gNB (it can be received in DCP/DCI or in RRC Reconfiguration message, the UE applies the one which is latest received).

Step 2. The UE identifies/determines a starting time of an on duration timer The starting time of an on duration timer is at drx-SlotOffset from the beginning of the identified/determined (in step 1) subframe. drx-Slot-Offset is the latest received DRX slot offset from the gNB (it can be offset in DCP or drx-SlotOffset in RRC Reconfiguration message, the UE applies the one which is latest received).

Step 3. From the identified/determined (in step 2) starting time of the on duration timer, the UE identifies/determines the starting of DCP/DCI monitoring. The DCP/DCI monitoring starts at ps-Offset prior to a slot from the identified/determined (in step 2) starting time of on duration timer. The ps-Offset is received in the RRC Reconfiguration message.

Step 4. The UE receives DCP in one of the slots monitored for DCP and the DCP indicates (i.e., wakeup indication bit for UE is set to 1) the UE to start the on duration timer.

If DCP includes 'drx-SlotOffset', the UE starts drx-onDurationTimer after drx-SlotOffset received in DCP from the beginning of subframe, here subframe is the subframe identified in step 1>.

If DCP does not include 'offset', the UE starts drx-onDurationTimer after drx-SlotOffset from the beginning of the subframe here subframe is the subframe identified in step 1>. The drx-SlotOffset is the latest received DRX slot offset from the gNB (it can be offset in DCP or drx-SlotOffset in an RRC Reconfiguration message, whichever is latest received).

drx-onDurationTimer is received in the RRC Reconfiguration message. If DCP indicates drx-onDurationTimer value, the UE starts a drx-onDurationTimer of an indicated value when starting this timer; otherwise, the UE starts an drx-onDurationTimer of the value configured in an RRC Reconfiguration message (as in legacy for DRX group(s)).

Another example of UE operation according to an embodiment is explained below (drx-StartOffset and drx-SlotOffset can be signaled in DCP, drx-SlotOffset is applied from current DRX cycle for starting on duration timer, drx-StartOffset is applied from next DRX cycle):

Step 0. The UE receives the RRC Reconfiguration message including the DRX configuration(s) and DCP configuration/parameters as explained earlier. RRC Reconfiguration message includes first configuration of drx-StartOffset.

Step 1. The UE identifies the subframe which satisfies [(SFN*10)+subframe number] modulo (drx-Long-Cycle)=drx-StartOffset. drx-LongCycle is received in the RRC Reconfiguration message. drx-StartOffset is received RRC Reconfiguration message.

Step 2. The UE identifies/determines a starting time of an on duration timer. The starting time of the on duration timer is at drx-SlotOffset from the beginning of the identified/determined (in step 1) subframe. The drx-SlotOffset is received in an RRC Reconfiguration message.

Step 3. From the identified/determined (in step 2) starting time of the on duration timer, the UE identifies/determines the starting of DCP monitoring. The DCP monitoring starts at ps-Offset prior to a slot from the identified/determined (in step 2) starting time of on duration timer. The ps-Offset is received in the RRC Reconfiguration message.

Step 4. The UE receives DCP in one of the slots monitored for DCP and DCP indicates (i.e., wakeup indication bit for UE is set to 1) the UE to start the on duration timer. DCP includes drx-SlotOffset and drx-StartOffset.

UE starts drx-onDurationTimer after drx-SlotOffset received in DCP from the beginning of subframe. Here, the subframe is the subframe identified in step 1>.

drx-onDurationTimer is received in the RRC Reconfiguration message. If DCP indicates drx-onDurationTimer value, the UE starts drx-onDurationTimer of indicated value when starting this timer; otherwise, the UE starts the drx-onDurationTimer of the value configured in the RRC Reconfiguration message (as in legacy for DRX group(s)).

Step 5. For next DRX cycle, the UE identifies the subframe which satisfies [(SFN*10)+subframe number] modulo (drx-LongCycle)=drx-StartOffset. The drx-LongCycle is received in the RRC Reconfiguration message. The drx-StartOffset is the one received in DCP in step 4.

Step 6. The UE identifies/determines a starting time of an on duration timer. The starting time of the on duration timer is at drx-SlotOffset from the beginning of the identified/determined (in step 5) subframe. The drx-SlotOffset is the one received in DCP in step 4.

Step 7. From the identified/determined (in step 6) starting time of the on duration timer, the UE identifies/determines the starting of DCP monitoring. The DCP monitoring starts at ps-Offset prior to a slot from the identified/determined (in step 6) starting time of the on duration timer. The ps-Offset is received in the RRC Reconfiguration message.

Step 8. The UE receives DCP in one of the slots monitored for DCP and the DCP indicates (i.e., wakeup indication bit for UE is set to 1) the UE to start the on duration timer.

Case 1: DCP Includes Drx-SlotOffset.

The UE starts drx-onDurationTimer after drx-SlotOffset received in DCP in step 8 from the beginning of the subframe. Here, the subframe is the subframe identified in step 5>.

Case 2: DCP does not Includes Drx-SlotOffset

The UE starts drx-onDurationTimer after drx-SlotOffset received in DCP in step 4 from the beginning of the subframe. Here, the subframe is the subframe identified in step 5>.

drx-onDurationTimer is received in the RRC Reconfiguration message. If DCP indicates drx-onDurationTimer value, the UE starts drx-onDurationTimer of indicated value when starting this timer; otherwise, the UE starts drx-onDurationTimer of the value configured in the RRC Reconfiguration message (as in legacy for DRX group(s)).

Another example of UE operations according to an embodiment is explained below (drx-StartOffset and drx-SlotOffset can be signaled in DCP, drx-SlotOffset and drx-StartOffset is applied from current DRX cycle for starting on duration timer):

Step 0. The UE receives the RRC Reconfiguration message including the DRX configuration(s) and DCP configuration/parameters as explained above. The UE then performs the following for each DRX cycle:

Step 1. The UE identifies the subframe which satisfies [(SFN*10)+subframe number] modulo (drx-Long-Cycle)=drx-StartOffset. drx-LongCycle is received in the RRC Reconfiguration message. The drx-StartOffset is the latest received DRX start offset from the gNB (it can be received in DCP/DCI or in RRC Reconfiguration message, the UE applies the one which is latest received).

Step 2. The UE identifies/determines a starting time of an on duration timer. The starting time of the on duration timer is at drx-SlotOffset from the beginning of the identified/determined (in step 1) subframe. The drx-SlotOffset is the latest received DRX slot offset from the gNB (it can be offset in DCP or drx-SlotOffset in RRC Reconfiguration message, the UE applies the one which is latest received).

Step 3. From the identified/determined (in step 2) starting time of the on duration timer, the UE identifies/determines the starting of DCP monitoring. The DCP monitoring starts at ps-Offset prior to a slot from the identified/determined (in step 2) starting time of on duration timer. The ps-Offset is received in the RRC Reconfiguration message.

Step 4. The UE receives DCP in one of the slots monitored for DCP and the DCP indicates (i.e. wakeup indication bit for UE is set to 1) the UE to start the on duration timer.

The UE starts drx-onDurationTimer after drx-SlotOffset from the beginning of the subframe, Here, the subframe is the subframe which satisfies the equation [(SFN*10)+subframe number] modulo (drx-LongCycle)=drx-StartOffset. drx-StartOffset and drx-SlotOffset are the latest received DRX start offset from gNB (it can be from the DCP or RRC Reconfiguration message, the UE uses the one which is latest received). The drx-StartOffset and drx-SlotOffset used in this step can be different from the one used in step 1 and step 2, as the latest received DCP in step 4 may include these parameters.

drx-onDurationTimer is received in the RRC Reconfiguration message. If DCP indicates drx-onDurationTimer value, the UE starts a drx-onDurationTimer of an indicated value when starting this timer; otherwise, the UE starts the drx-onDurationTimer with the value configured in the RRC Reconfiguration message (as in legacy for DRX group(s)).

Another example of UE operations according to an embodiment is explained below(drx-StartOffset and drx-SlotOffset can be signaled in DCP, drx-SlotOffset and drx-StartOffset is applied from current DRX cycle for starting on duration timer):

Step 0. The UE receives the RRC Reconfiguration message including the DRX configuration(s) and DCP configuration/parameters as explained earlier.

Step 1. The UE identifies the subframe which satisfies [(SFN*10)+subframe number] modulo (drx-LongCycle)=drx-StartOffset. drx-LongCycle is received in the RRC Reconfiguration message. The drx-StartOffset is the one received in the RRC Reconfiguration message.

Step 2. The UE identifies/determines a starting time of an on duration timer. The starting time of the on duration timer is at drx-SlotOffset from the beginning of the identified/determined (in step 1) subframe. The drx-SlotOffset is the one received in the RRC Reconfiguration message.

Step 3. From the identified/determined (in step 2) starting time of the on duration timer, the UE identifies/determines the starting of DCP monitoring. The DCP monitoring starts at ps-Offset prior to a slot from the identified/determined (in step 2) starting time of the on duration timer. The ps-Offset is received in the RRC Reconfiguration message.

Step 4. The UE receives DCP in one of the slots monitored for DCP and the DCP indicates (i.e., wakeup indication bit for UE is set to 1) UE to start the on duration timer. DCP includes drx-SlotOffset and drx-StartOffset. The UE starts drx-onDurationTimer after drx-SlotOffset received in DCP from the beginning of subframe. Here, the subframe is the subframe which satisfies the equation [(SFN*10)+subframe number] modulo (drx-LongCycle)=drx-StartOffset. drx-StartOffset is the one received in the DCP. The drx-StartOffset and drx-SlotOffset used in this step can be different from the one used in step 1 and step 2.

drx-onDurationTimer is received in the RRC Reconfiguration message. If DCP indicates drx-onDurationTimer value, the UE starts the drx-onDurationTimer of an indicated value; otherwise, the UE starts the drx-onDurationTimer with the value configured in the RRC Reconfiguration message (as in legacy for DRX group(s)).

Step 5. For next DRX cycle, the UE identifies the subframe which satisfies [(SFN*10)+subframe number] modulo (drx-LongCycle)=drx-StartOffset. drx-LongCycle is received in the RRC Reconfiguration message. The drx-StartOffset is the one received in DCP in step 4.

Step 6. The UE identifies/determines a starting time of an on duration timer. The starting time of the on duration timer is at drx-SlotOffset from the beginning of the identified/determined (in step 5) subframe. The drx-SlotOffset is the one received in DCP in step 4.

Step 7. From the identified/determined (in step 6) starting time of the on duration timer, the UE identifies/determines the starting of DCP monitoring, The DCP monitoring starts at ps-Offset prior to a slot from the identified/determined (in step 6) starting time of the on duration timer. The ps-Offset is received in the RRC Reconfiguration message.

Step 8. The UE receives DCP in one of the slots monitored for DCP and the DCP indicates (i.e., wakeup indication bit for UE is set to 1) UE to start the on duration timer.

Case 1: DCP Includes Drx-SlotOffset and Drx-StartOffset.

The UE starts drx-onDurationTimer after drx-SlotOffset received in DCP in step 8 from the beginning of the subframe, which satisfies the equation [(SFN*10)+subframe number] modulo (drx-LongCycle)=drx-StartOffset. drx-StartOffset is the one received in the DCP in step 8.

Case 2: DCP Includes Drx-SlotOffset. DCP does not Include Drx-StartOffset.

The UE starts drx-onDurationTimer after drx-SlotOffset received in DCP in step 8 from the beginning of the subframe, which satisfies the equation [(SFN*10)+subframe number] modulo (drx-LongCycle)=drx-StartOffset. drx-StartOffset is the one received in the DCP in step 4.

Case 3: DCP does not Includes Drx-SlotOffset and Drx-StartOffset

The UE starts drx-onDurationTimer after drx-SlotOffset received in DCP in step 4 from the beginning of the subframe, which satisfies the equation [(SFN*10)+subframe number] modulo (drx-LongCycle)=drx-StartOffset. drx-StartOffset is the one received in the DCP in step 4.

drx-onDurationTimer is received in the RRC Reconfiguration message. If DCP indicates drx-onDurationTimer value, the UE starts the drx-onDurationTimer of an indicated value when starting this timer; otherwise, the UE starts drx-onDurationTimer with the value configured in the RRC Reconfiguration message (as in legacy for DRX group(s)).

Instead of DCP, another signal such a low power wakeup signal/indication can be used in operation defined in this disclosure and same operation is applied by replacing DCP with low power wakeup signal/indication.

EMBODIMENT 2

SDT in a 5G wireless communication system: SDT is a procedure allowing data and/or signaling transmission while a UE remains in an RRC_INACTIVE state (i.e., without transitioning to RRC_CONNECTED state). SDT is enabled on a radio bearer basis and is initiated by the UE if less than a configured amount of UL data awaits transmission across all radio bearers for which SDT is enabled, the DL RSRP is above a configured threshold, and a valid SDT resource is available.

An SDT procedure is initiated with either a transmission over RACH (configured via SI) or over Type 1 CG resources (configured via dedicated signaling in RRCRelease). The SDT resources can be configured on initial BWP for both RACH and CG. RACH and CG resources for SDT can be configured on either or both of NUL and SUL carriers. The CG resources for SDT are valid only within the cell the UE received RRCRelease and transitioned to RRC_INACTIVE state. For RACH, the network can configure 2-step and/or 4-step RA resources for SDT. When both 2-step and 4-step RA resources for SDT are configured, the UE selects the RA type. CFRA is not supported for SDT over RACH.

Once Initiated, the SDT Procedure is Either:

successfully completed after the UE is directed to an RRC_IDLE state (via RRCRelease), an RRC_INACTIVE state (via RRCRelease or RRCReject), or an RRC_CONNECTED state (via RRCResume or RRC-Setup); or unsuccessfully completed upon cell re-selection, expiry of the SDT failure detection timer (also referred as T319a), a MAC entity reaching a configured maximum PRACH preamble transmission threshold, an RLC entity reaching a configured maximum retransmission threshold, or expiry of SDT-specific timing alignment timer while SDT procedure is ongoing over CG and the UE has not received a response from the network after the initial PUSCH transmission.

Upon unsuccessful completion of the SDT procedure, the UE transitions to an RRC_IDLE state.

The initial PUSCH transmission during the SDT procedure includes at least the CCCH message. After the SDT procedure is initiated, the UE starts an SDT failure detection timer (also referred as T319a) when the UE first transmits the MAC PDU including the CCCH message. When using CG resources for the initial SDT transmission, the UE can perform autonomous retransmission of the initial transmission if the UE does not receive confirmation from the network (dynamic UL grant or DL assignment) before a configured timer expires. After the initial PUSCH transmission, subsequent transmissions are handled differently depending on the type of resource used to initiate the SDT procedure:

When using CG resources, the network can schedule subsequent UL transmissions using dynamic grants or they can take place on the following CG resource occasions. The DL transmissions are scheduled using dynamic assignments. The UE can initiate subsequent UL transmission only after reception of confirmation (dynamic UL grant or DL assignment) for the initial PUSCH transmission from the network. For subsequent UL transmission, the UE cannot initiate re-transmission over a CG resource.

When using RACH resources, the network can schedule subsequent UL and DL transmissions using dynamic UL grants and DL assignments, respectively, after the completion of the RA procedure.

While the SDT procedure is ongoing, if data appears in a buffer of any radio bearer not enabled for SDT, the UE initiates a transmission of a non-SDT data arrival indication using UEAssistanceInformation message to the network and, if available, includes the resume cause.

An SDT procedure over CG resources can only be initiated with valid UL timing alignment. The UL timing alignment is maintained by the UE based on an SDT-specific timing alignment timer configured by the network via dedicated signaling and, for initial CG-SDT transmission, also by DL RSRP of configured number of highest ranked SSBs which are above a configured RSRP threshold. Upon expiry of the SDT-specific timing alignment timer, the CG resources are released, while maintaining the CG resource configuration.

Logical channel restrictions configured by the network while in RRC_CONNECTED state and/or in RRCRelease message for radio bearers enabled for SDT, if any, are applied by the UE during SDT procedure.

The network may configure the UE to apply robust header compression (ROHC) continuity for SDT either when the UE initiates SDT in the cell where the UE received RRCRelease and transitioned to RRC_INACTIVE state or when the UE initiates SDT in a cell of its RNA.

Figure 7:
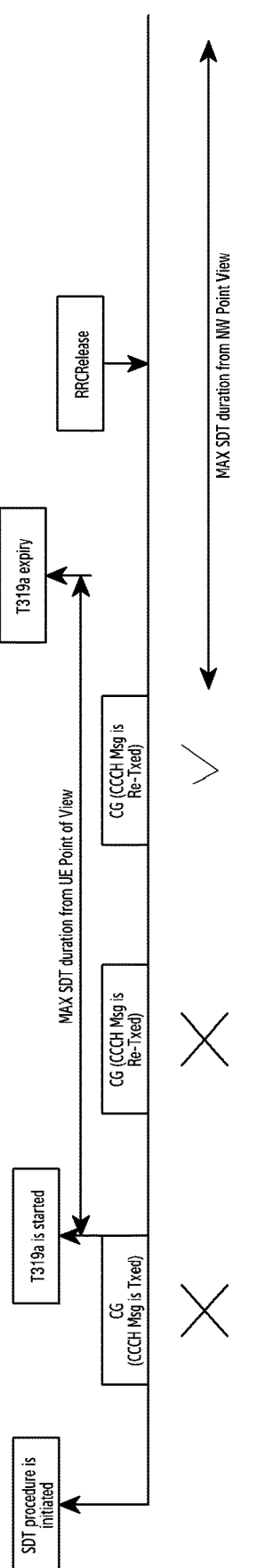
FIG. 7 illustrates an SDT procedure in accordance with an embodiment.

FIG. 7 illustrates an SDT procedure in accordance with an embodiment.

After the SDT procedure is initiated, the UE starts timer T319a when the UE first transmits the MAC PDU including the CCCH message. FIG. 7 is an example for CG-SDT. Timer 319a is started when the initial HARQ packet including a MAC PDU is transmitted in a CG occasion. The UE also starts a CG retransmission timer. In case transmission in the CG occasion fails (i.e., CG retransmission timer expires), the UE performs HARQ retransmission of HARQ packet including CCCH message.

In FIG. 7, the $2^{nd}$ retransmission of the HARQ packet including CCCH message is successfully transmitted. However, as can be seen FIG. 7. there is a mismatch between the UE and the network with respect to a MAX SDT duration, which is equal to value of timer T319a. Consequently, by the time network sends an RRCRelease, the UE's T319a time will have already expired and the UE unnecessarily enters an RRC_IDLE state.

EMBODIMENT 2-1

Handling T319a for SDT Procedure

EMBODIMENT 2-1-A (FIG. 8, and FIG. 9): T319a Restarting for CG-SDT

Figure 8:
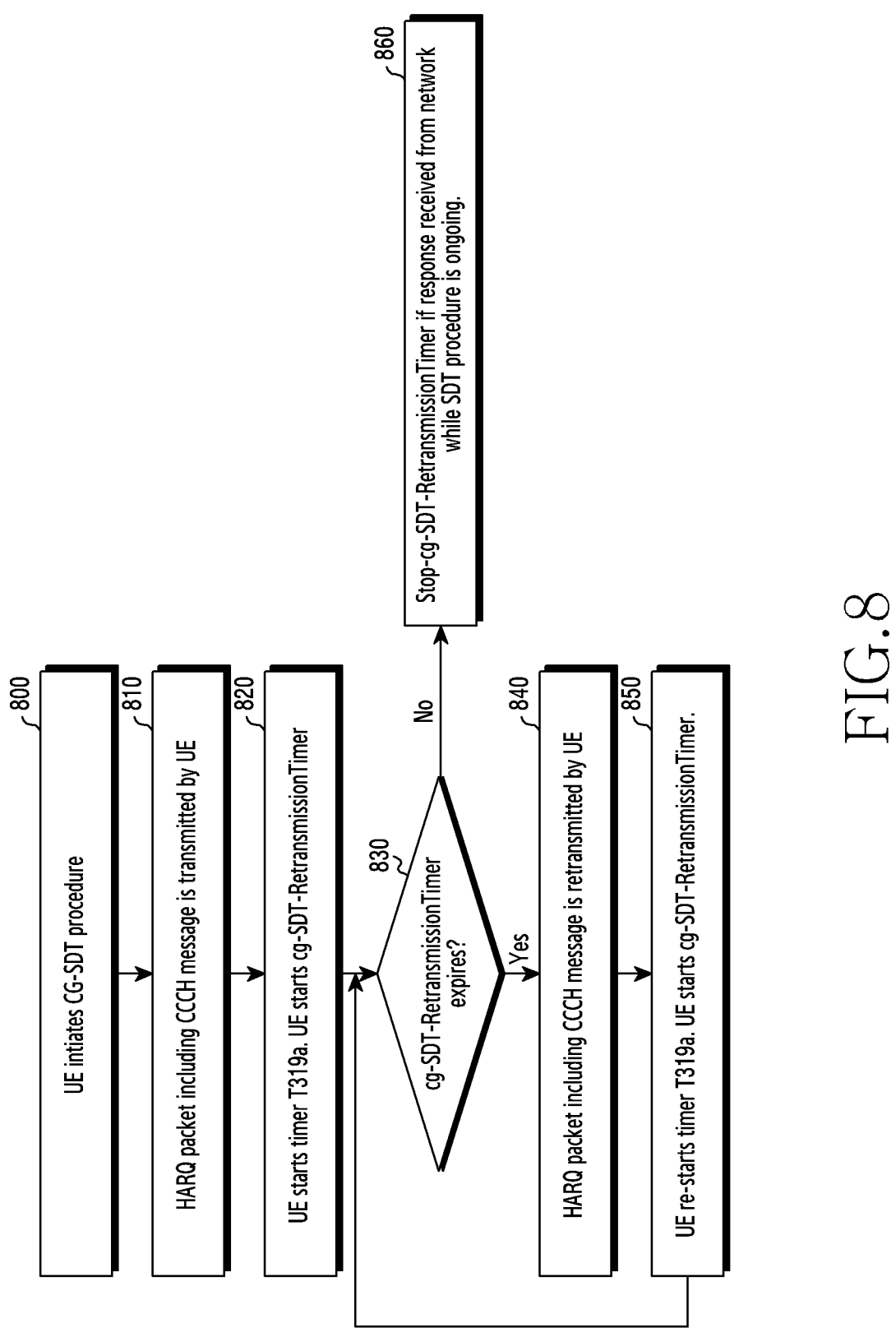
FIG. 8 is a flow chart illustrating operations for timer handling for SDT in accordance with an embodiment.

FIG. 8 is a flow chart illustrating operations for timer handling for SDT in accordance with an embodiment.

Figure 9:
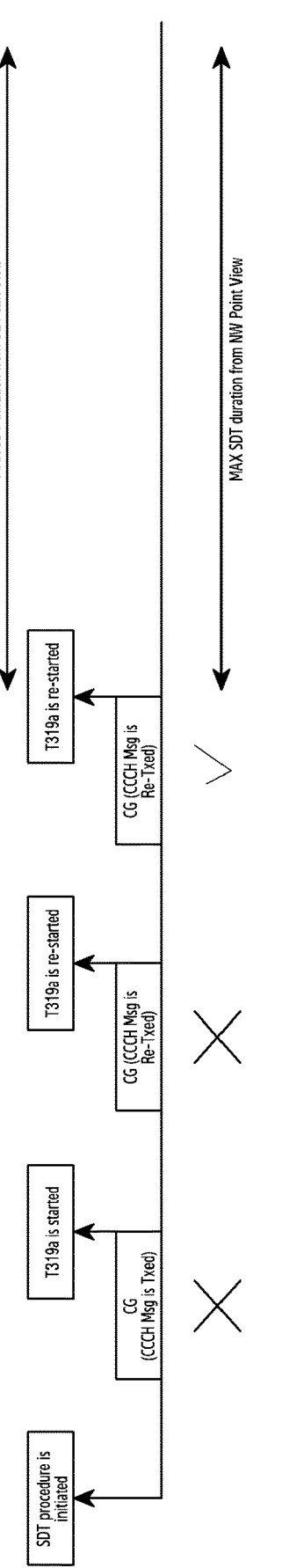
FIG. 9 illustrates timer handling for SDT in accordance with an embodiment.

FIG. 9 illustrates timer handling for SDT in accordance with an embodiment.

A UE is in an RRC_CONNECTED state. The UE receives an RRCRelease message from a gNB with suspend configuration. The RRCRelease message indicates or includes a configuration of CG resources for SDT. The UE enters an RRC_INACTIVE state upon receiving the RRCRelease message with the suspend configuration (or UE enters RRC_IDLE upon receiving RRCRelease message without suspend configuration).

Or:

A UE is in an RRC_INACTIVE state. The UE receives an RRCRelease message from a gNB with a suspend configuration during the SDT procedure in the RRC_INACTIVE state. The RRCRelease message indicates or includes configuration of CG resources for SDT.

Or:

A UE is in an RRC_IDLE state. The UE receives an RRCRelease message from a gNB during the SDT procedure in the RRC_IDLE state. The RRCRelease message indicates or includes a configuration of CG resources for SDT.

The UE starts CG-SDT timer (also referred as the timing alignment timer for CG-SDT) upon receiving the RRCRelease message including the CG resources for SDT. The value of CG-SDT timer is received in the RRCRelease message.

While in the RRC_INACTIVE state (or in RRC_IDLE state), upon arrival of data for one or more SDT RB(s), SDT criteria (DL RSRP of cell is above RSRP threshold, data available for SDT RB(s) is below the data volume threshold, etc.) is met and criteria to initiate CG-SDT is met, the UE initiates a CG-SDT procedure. The UE initiates the CG-SDT only if a cell is not changed (i.e., the UE is in same cell from which UE has last received RRC Release message), a TA is valid (e.g., CG-SDT-Timer is running), CG resources for SDT are configured, and at least one SSB associated with CG resources is above a configured threshold.

Referring to FIG. 8, an SDT procedure is initiated in step 800. When the MAC PDU (or HARQ packet) including CCCH message is first transmitted by MAC entity in the UE in step 810, the UE starts an SDT timer, an SDT error detection timer, or T319a in step 820. The SDT timer/SDT error detection timer/T319a is different from a CG-SDT timer. The SDT timer/SDT error detection timer/T319a is stopped upon completion (successful or unsuccessful as described earlier) of the SDT procedure.

The UE also starts a cg-SDT-RetransmissionTimer when initial HARQ packet including CCCH message is transmitted in a CG occasion in step 820. The cg-SDT-RetransmissionTimer is stopped in step 860, if the UE receives confirmation from the network (i.e. dynamic UL grant or DL assignment) before the CG retransmission timer expires in step 830. For example, if an uplink grant has been received on the PDCCH for the MAC entity's C-RNTI while the cg-SDT-RetransmissionTimer is running, the cg-SDT-RetransmissionTimer is stopped. If a downlink assignment for this PDCCH occasion and this Serving Cell has been received on the PDCCH for the MAC entity's C-RNTI while the cg-SDT-RetransmissionTimer is running, the cg-SDT-RetransmissionTimer is stopped. If a UL grant for this PDCCH occasion has been received for this Serving Cell on the PDCCH for the MAC entity's CS-RNTI and if the NDI in the received HARQ information is 1, while the cg-SDT-RetransmissionTimer is running, the cg-SDT-RetransmissionTimer is stopped.

If the cg-SDT-RetransmissionTimer expires for HARQ process used for HARQ packet including CCCH message in step 830, the UE retransmits HARQ packets in a CG occasion corresponding to same HARQ process in step 840 and restarts the SDT timer/SDT error detection timer/T319a in step 850. An advantage this approach is that UE and network will be synchronized with respect to start of T319a.

Criteria for selecting CG-SDT: CG-SDT criteria is considered met, if all of the following conditions are met, 1) available data volume<=data volume threshold (data volume threshold is signaled by a gNB and can be specific to CG-SDT or common for CG-SDT and RA-SDT)
2) RSRP (cell quality or RSRP of path loss reference) is greater than or equal to a configured threshold (threshold is signaled by gNB and can be specific to CG-SDT or common for CG-SDT and RA-SDT)
3) CG-SDT resources are configured on the selected UL carrier and are valid (e.g. TA is valid (TAT-SDT timer is running), UE's cell is same as the cell from which CG resources are received)

Selected carrier is the NUL, if SUL is not configured in the cell.

Selected carrier is the NUL, if SUL is configured in the cell and CG resources for SDT are not configured for SUL Selected carrier is the NUL, if SUL is configured in the cell and RSRP is greater than a threshold (threshold is signaled by gNB)

Selected carrier is the SUL, if SUL is configured in the cell and RSRP is not greater than a threshold (threshold is signaled by gNB)

Selected carrier is the SUL, if SUL is configured in the cell and CG resources for SDT are not configured for NUL For each UL transmission, if a CG resource is available in time first for SUL, SUL is selected for that UL transmission. If a CG resource is available in time first for NUL, NUL is selected for that UL transmission

EMBODIMENT 2-1-B

T319a Restarting for 4 Step RA-SDT

A UE is in an RRC_CONNECTED state. The UE receives an RRCRelease message from a gNB with a suspend configuration. The UE enters the RRC_INACTIVE state upon receiving the RRCRelease message with the suspend configuration (or UE enters RRC_IDLE upon receiving RRCRelease message without suspend configuration).

Or:

A UE is in an RRC_INACTIVE state. The UE receives an RRCRelease message from a gNB with a suspend configuration during the SDT procedure in the RRC_INACTIVE state.

Or:

A UE is in an RRC_IDLE state. The UE receives an RRCRelease message from a gNB during the SDT procedure in the RRC_IDLE state. The RRCRelease message indicates or includes a configuration of CG resources for SDT.

While in the RRC_INACTIVE state (or in RRC_IDLE state), upon arrival of data for one or more SDT RB(s), SDT criteria (DL RSRP of cell is above RSRP threshold, data available for SDT RB(s) is below the data volume threshold, etc.) is met and criteria to initiate RA-SDT is met, the UE initiates an RA-SDT procedure. The UE initiates 4 step RA for RA-SDT procedure.

Figure 10:
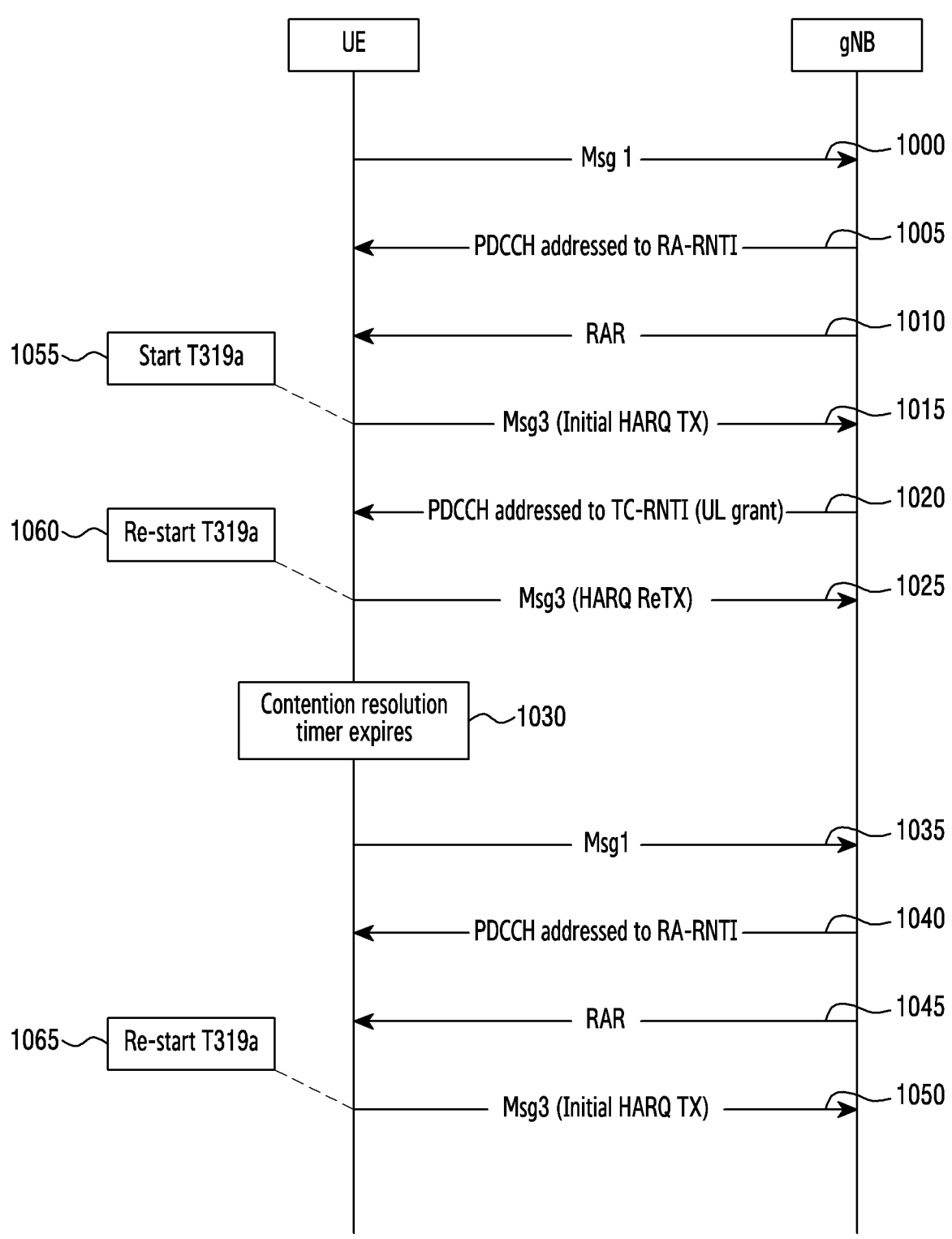
FIG. 10 is a signal flow diagram of an SDT procedure in accordance with an embodiment.

FIG. 10 is a signal flow diagram illustrating an SDT procedure in accordance with an embodiment.

Referring to FIG. 10, upon initiation of the SDT procedure, a UE transmits Msg1 (i.e., a PRACH preamble) in step 1000.

The UE receives a PDCCH addressed to an RA-RNTI in step 1005 and successfully decodes the TB including an RAR in step 1010. The UE then generates a new Msg3 MAC PDU. The UE stores the Msg3 in Msg3 buffer.

In the UL grant received in the RAR, the UE transmits an initial HARQ transmission of Msg3 (i.e., MAC PDU including CCCH message or SDU from Msg3 buffer) in step 1015.

In step 1055, the UE starts an SDT timer/SDT error detection timer/T319a, upon the initial HARQ transmission of Msg3 (i.e., MAC PDU including CCCH message or SDU from Msg3 buffer). The UE also starts contention resolution timer.

While the contention resolution timer is running, the UE receives a PDCCH addressed to a TC-RNTI indicating a UL grant for a HARQ retransmission of Msg3 in step 1020. The UE transmits the HARQ re-transmission of Msg3 (i.e., MAC PDU including CCCH message or SDU) in step 1025. The UE re-starts the SDT timer/SDT error detection timer/T319a in step 1060, upon a HARQ re-transmission of Msg3 (i.e., a MAC PDU including CCCH message or SDU from Msg3 buffer). The UE also restarts the contention resolution timer.

If the contention resolution timer expires in step 1030, the UE retransmits Msg1 in step 1035. The UE receives a PDCCH addressed to an RA-RNTI in step 1040 and successfully decodes the TB including an RAR in step 1045. In the UL grant received in the RAR, the UE transmits an initial HARQ transmission of Msg3 (i.e., MAC PDU including CCCH message or SDU from Msg3 buffer) in step 1050. The UE re-starts the SDT timer/SDT error detection timer/T319a in step 1065, upon an initial HARQ transmission of Msg3 (i.e., a MAC PDU including CCCH message or SDU from Msg3 buffer). The UE also starts contention resolution timer.

EMBODIMENT 2-1-C

T319a Restarting for 2 Step RA-SDT

A UE is in an RRC_CONNECTED state. The UE receives an RRCRelease message from a gNB with a suspend configuration. The UE enters an RRC_INACTIVE state upon receiving the RRCRelease message with the suspend configuration (or the UE enters an RRC_IDLE upon receiving the RRCRelease message without suspend configuration).
Or:

A UE is in an RRC_INACTIVE state. The UE receives an RRCRelease message from a gNB with a suspend configuration during the SDT procedure in the RRC_INACTIVE state.
Or:

A UE is in an RRC_IDLE state. The UE receives an RRCRelease message from a gNB during the SDT procedure in the RRC_IDLE state. The RRCRelease message indicates or includes a configuration of CG resources for SDT.

While in an RRC_INACTIVE state (or in an RRC_IDLE state), upon arrival of data for one or more SDT RB(s), SDT criteria (DL RSRP of cell is above RSRP threshold, data available for SDT RB(s) is below the data volume threshold, etc.) is met and criteria to initiate RA-SDT is met, the UE initiates an RA-SDT procedure. For example, the UE initiates a 2 step RA for the RA-SDT procedure.

Figure 11:
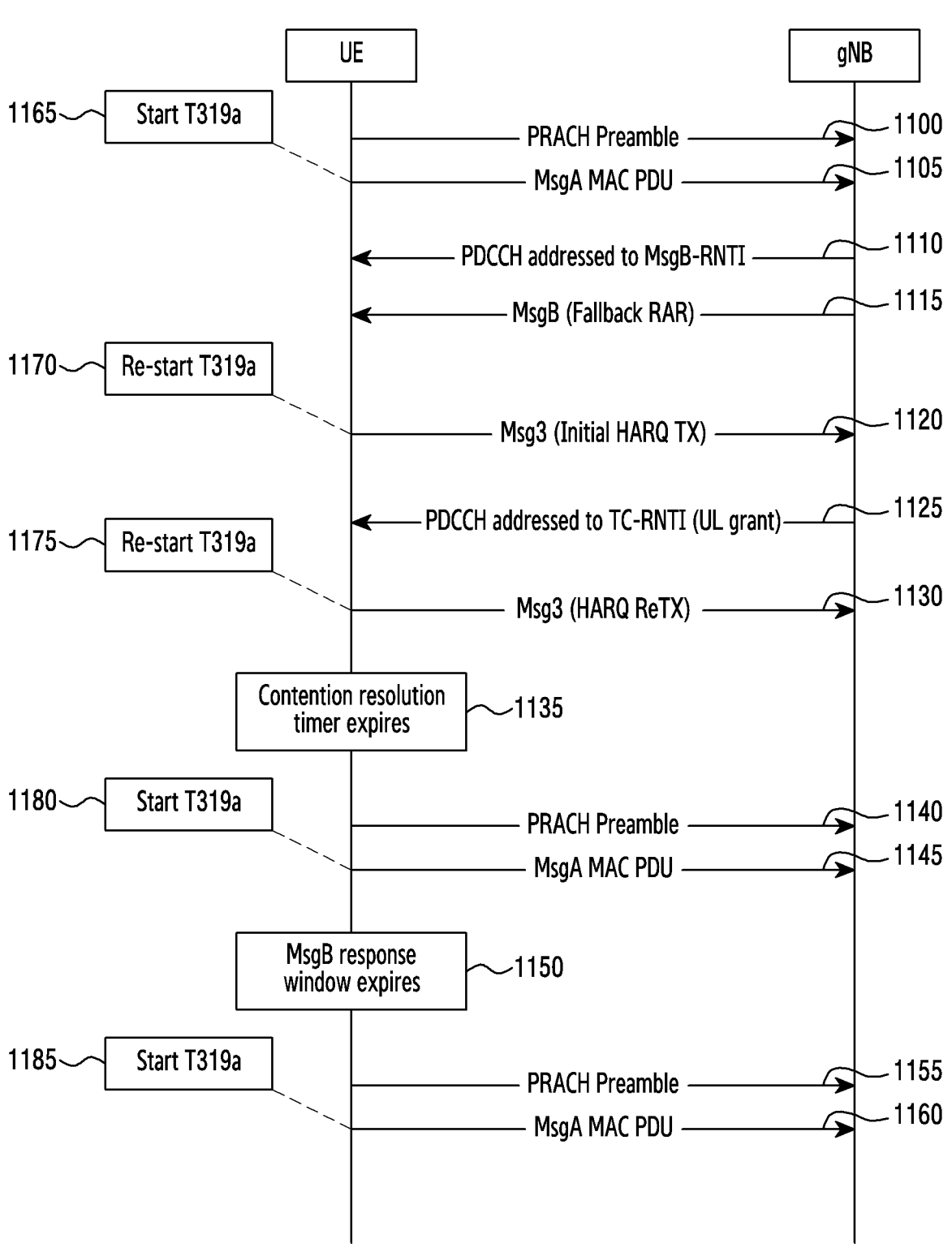
FIG. 11 is a signal flow diagram of an SDT procedure in accordance with an embodiment.

FIG. 11 is a signal flow diagram of an SDT procedure in accordance with an embodiment.

Referring to FIG. 11, upon initiation of an SDT procedure, a UE transmits MsgA (i.e., a PRACH preamble in a PRACH occasion and a MsgA MAC PDU in a PUSCH occasion) in steps 1100 and 1105. The MsgA MAC PDU is stored in a MsgA buffer. In step 1165. the UE starts an SDT timer/SDT error detection timer/T319a, when transmitting the MsgA MAC PDU in the PUSCH occasion. The MsgA MAC PDU includes a CCCH message.

Upon transmitting MsgA, the UE monitors a PDCCH addressed to MsgB-RNTI in a MsgB response window. The UE receives the PDCCH addressed to MSGB-RNTI in step 1110 and successfully decodes the TB including a fallback RAR in step 1115. The fallback RAR includes a UL grant. In the UL grant received in the fallback RAR, the UE transmits an initial HARQ transmission of Msg3 in step 1120, where Msg3 is the MsgA MAC PDU from the MsgA buffer. The UE re starts SDT timer/SDT error detection timer/T319a in step 1170, when transmitting initial HARQ transmission of Msg3, i.e., when retransmitting MsgA MAC PDU. The UE also starts a contention resolution timer.

While the contention resolution timer is running, the UE receives a PDCCH addressed to a TC-RNTI indicating a UL grant for a HARQ retransmission of Msg3 in step 1125. The UE transmits the HARQ re-transmission of Msg3 (i.e., a MAC PDU including a CCCH message or an SDU) in step 1130. The UE re-starts the SDT timer/SDT error detection timer/T319a in step 1175, upon a HARQ re-transmission of Msg3. The UE also restarts contention resolution timer.

If the contention resolution timer expires in step 1135, the UE transmits MsgA again (i.e., a PRACH preamble in a PRACH occasion and a MsgA MAC PDU from a MsgA buffer in a PUSCH occasion) in steps 1140 and 1145. The UE starts the SDT timer/SDT error detection timer/T319a in step 1180, when transmitting the MsgA MAC PDU in the PUSCH occasion.

Upon transmitting MsgA, the UE monitors a PDCCH addressed to MsgB-RNTI in a MsgB response window. If the MsgB response window expires in step 1150, the UE transmits MsgA again (i.e., the PRACH preamble in the PRACH occasion and the MsgA MAC PDU from the MsgA buffer in the PUSCH occasion) in steps 1155 and 1160. The UE restarts the SDT timer/SDT error detection timer/T319a in step 1185, when transmitting the MsgA MAC PDU in the PUSCH occasion.

EMBODIMENT 2-2-A

T319a Restarting Upon Receiving a Network Response for a CG-SDT

A UE is in an RRC_CONNECTED state. The UE receives an RRCRelease message from a gNB with a suspend configuration. The RRCRelease message indicates or includes a configuration of CG resources for SDT. The UE enters an RRC_INACTIVE state upon receiving the RRCRelease message with the suspend configuration (or the UE enters an RRC_IDLE upon receiving the RRCRelease message without the suspend configuration).
Or:

A UE is in an RRC_INACTIVE state (or in an RRC_IDLE state). The UE receives an RRCRelease message from a gNB with a suspend configuration during the SDT procedure in the RRC_INACTIVE state. The RRCRelease message indicates or includes a configuration of CG resources for SDT.
Or:

A UE is in an RRC_IDLE state. The UE receives an RRCRelease message from a gNB during the SDT procedure in the RRC_IDLE state. The RRCRelease message indicates or includes a configuration of CG resources for SDT.

Figure 12:
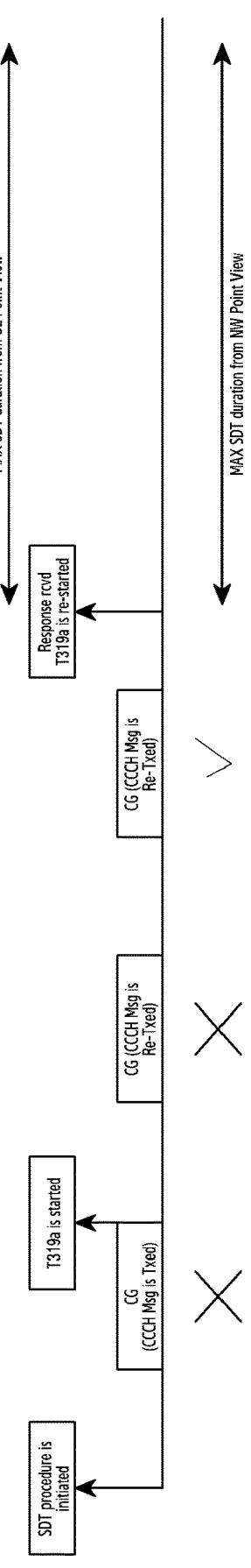
FIG. 12 illustrates timer handling for SDT in accordance with an embodiment.

FIG. 12 illustrates timer handling for SDT in accordance with an embodiment.

Figure 13:
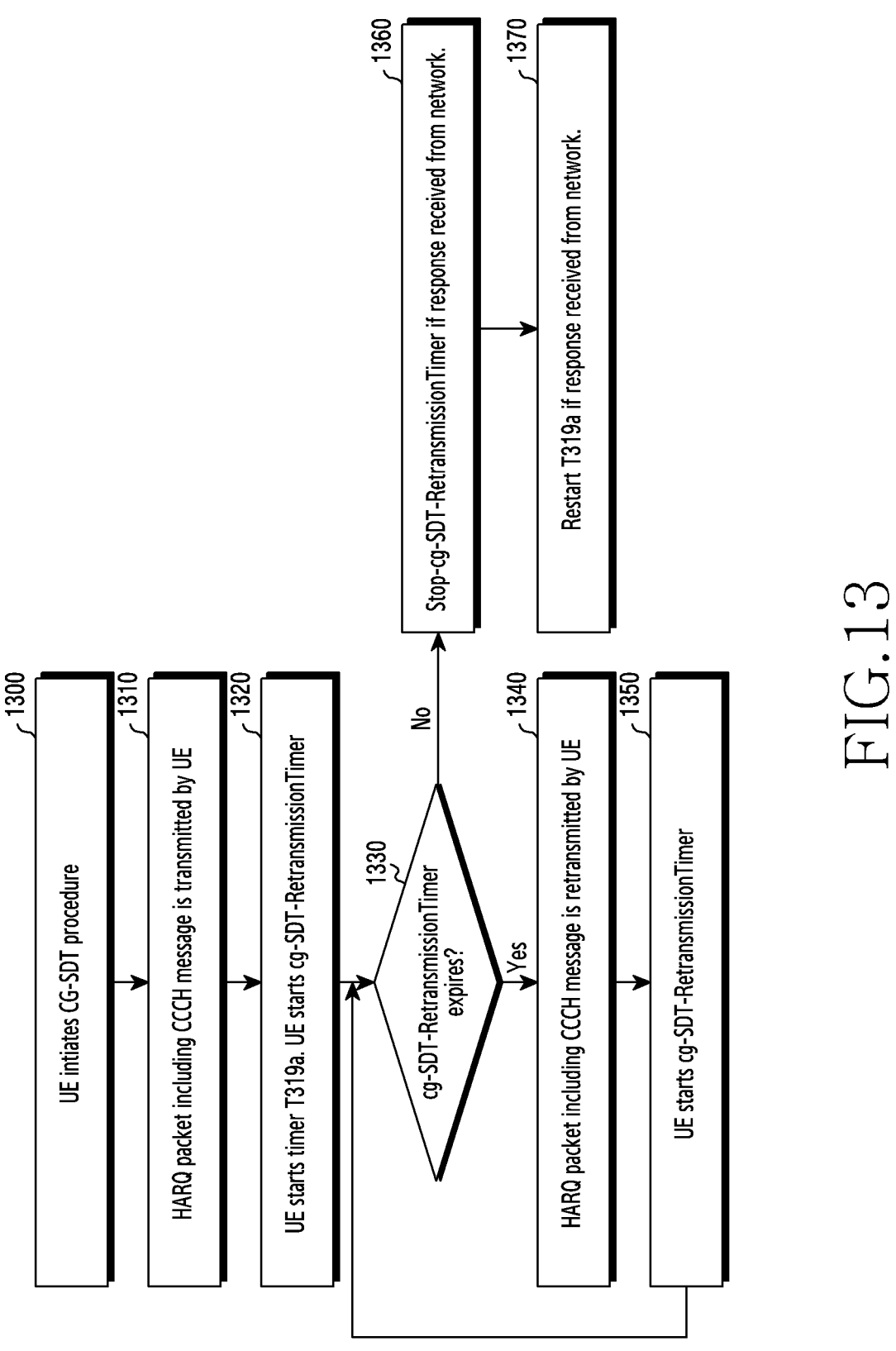
FIG. 13 is a flow chart illustrating operations of an SDT procedure in accordance with an embodiment.

FIG. 13 is a flow chart illustrating operations for an SDT procedure in accordance with an embodiment.

A UE starts a CG-SDT timer (also referred as the timing alignment timer for the CG-SDT) upon receiving an RRCRelease message including CG resources for SDT. The value of the CG-SDT timer is received in the RRCRelease message.

While in an RRC_INACTIVE state, upon arrival of data for one or more SDT RB(s), SDT criteria (DL RSRP of cell is above RSRP threshold, data available for SDT RB(s) is below the data volume threshold, etc.) is met and criteria to initiate CG-SDT is met, the UE initiates a CG-SDT procedure. The UE initiates the CG-SDT only if a cell is not changed (i.e., the UE is in same cell from which the UE has last received an RRC Release message), a TA is valid (e.g., a CG-SDT-Timer is running), CG resources for SDT are configured, and at least one SSB associated with a CG resources is above a configured threshold.

Upon initiation of SDT procedure in step 1300, when a MAC PDU including a CCCH message is first transmitted by a MAC entity in the UE in step 1310, the UE starts the SDT timer or SDT error detection timer or T319a in step 1320. The SDT timer/SDT error detection timer/T319a is different from a CG-SDT timer. The SDT timer/SDT error detection timer/T319a is stopped upon completion (successful or unsuccessful as described above) of SDT procedure.

In step 1320, the UE starts a cg-SDT-Retransmission-Timer when initial HARQ packet including CCCH message is transmitted in a CG occasion. The SDT timer/SDT error detection timer/T319a is re-started if the UE receives confirmation from the network (i.e., a dynamic UL grant or a DL assignment) after the initial CG-SDT transmission, i.e., UL transmission of MAC PDU including CCCH message during the SDT procedure in steps 1330, 1360, and 1370. If a UL grant has been received on the PDCCH for the MAC entity's C-RNTI while the cg-SDT-RetransmissionTimer is running, the SDT timer/SDT error detection timer/T319a is restart in steps 1330, 1360, and 1370. If a downlink assignment for this PDCCH occasion and this serving cell has been received on the PDCCH for the MAC entity's C-RNTI while the cg-SDT-RetransmissionTimer is running, the SDT timer/SDT error detection timer/T319a is restarted in steps 1330, 1360, and 1370. If a UL grant for this PDCCH occasion has been received for this serving cell on the PDCCH for the MAC entity's CS-RNTI and if the NDI in the received HARQ information is 1, while the cg-SDT-Retransmission-Timer is running, the SDT timer/SDT error detection timer/T319a is restarted in steps 1330, 1360, and 1370.

If a UL grant has been received on the PDCCH for the MAC entity's C-RNTI after the initial CG-SDT transmission, i.e., a UL transmission of MAC PDU including CCCH message during the SDT procedure, the SDT timer/SDT error detection timer/T319a is restarted. If a downlink assignment for this PDCCH occasion and this serving cell has been received on the PDCCH for the MAC entity's C-RNTI after the initial CG-SDT transmission, i.e., a UL transmission of MAC PDU including CCCH message during the SDT procedure, the SDT timer/SDT error detection timer/T319a is restarted. If a UL grant for this PDCCH occasion has been received for this serving cell on the PDCCH for the MAC entity's CS-RNTI and if the NDI in the received HARQ information is 1, after the initial CG- SDT transmission, i.e., a UL transmission of MAC PDU including CCCH message during the SDT procedure, the SDT timer/SDT error detection timer/T319a is restarted in steps 1340 and 1350).

An advantage this approach is that the UE and the network will be synchronized with respect to start of T319a and the UE does not have to restart the SDT timer/SDT error detection timer/T319a several times.

EMBODIMENT 2-2-B

T319a Restarting Upon Receiving a Network Response for a 4 Step RA-SDT

A UE is in an RRC_CONNECTED state. The UE receives an RRCRelease message from a gNB with a suspend configuration. The UE enters an RRC_INACTIVE state upon receiving the RRCRelease message with the suspend configuration (or the UE enters an RRC_IDLE upon receiving the RRCRelease message without suspend configuration). Or:

A UE is in an RRC_INACTIVE state. The UE receives an RRCRelease message from a gNB with a suspend configuration during the SDT procedure in the RRC_INACTIVE state.

Or:

A UE is in an RRC_IDLE state. The UE receives an RRCRelease message from a gNB during the SDT procedure in the RRC_IDLE state.

While in an RRC_INACTIVE state (or in the RRC_IDLE state), upon arrival of data for one or more SDT RB(s), SDT criteria (DL RSRP of cell is above RSRP threshold, data available for SDT RB(s) is below the data volume threshold, etc.) is met and criteria to initiate RA-SDT is met, the UE initiates an RA-SDT procedure. For example, the UE initiates a 4 step RA for an RA-SDT procedure.

Figure 14:
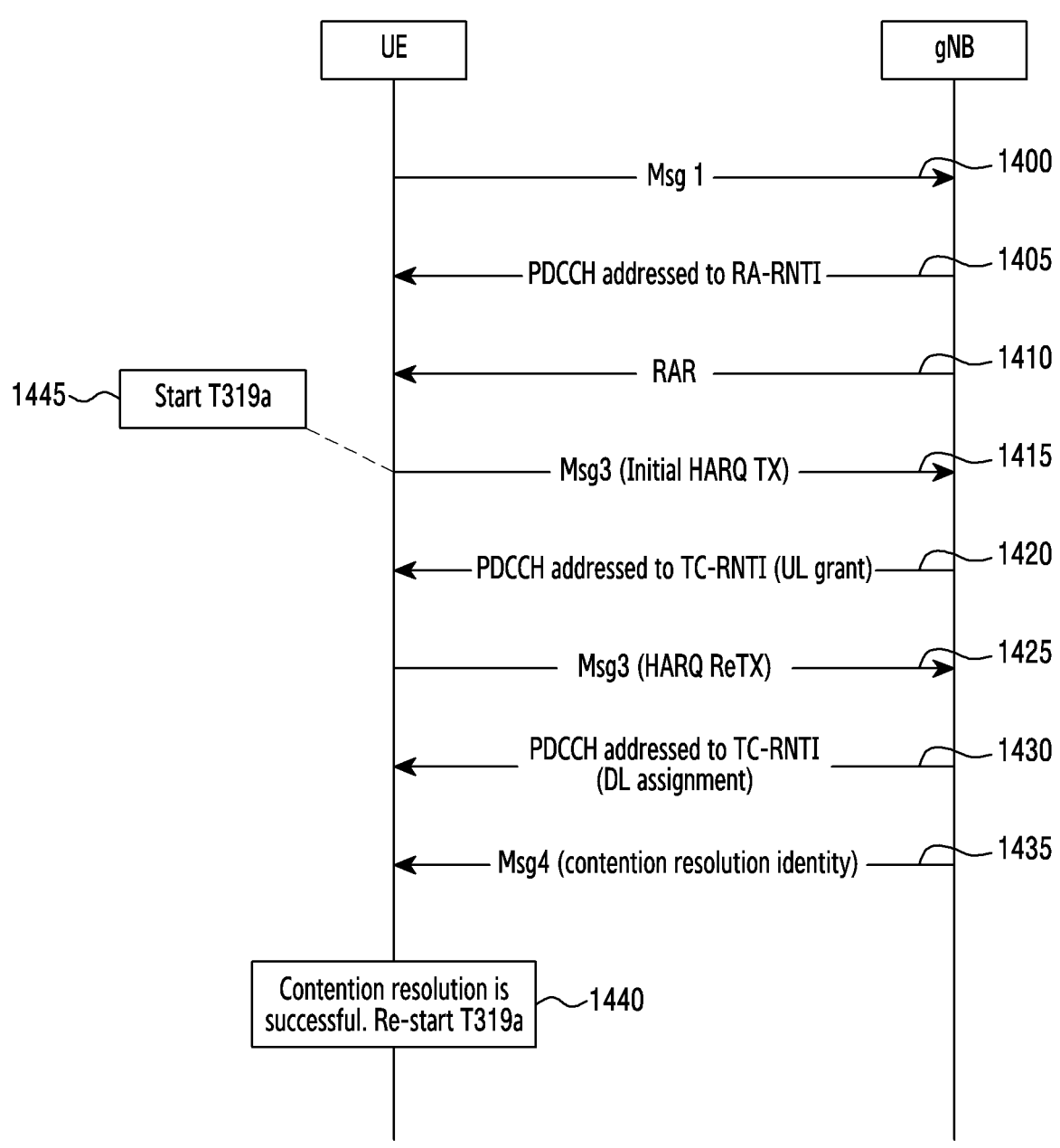
FIG. 14 is a signal flow diagram of an SDT procedure in accordance with an embodiment.

FIG. 14 is a signal flow diagram illustrating operations of an SDT procedure in accordance with an embodiment.

Referring to FIG. 14, upon initiation of the SDT procedure, a UE transmits Msg1 (i.e., a PRACH preamble) in step 1400.

The UE receives a PDCCH addressed to an RA-RNTI in step 1405 and successfully decodes a TB including an RAR in step 1410. The UE generates a new Msg3 MAC PDU. The UE stores the Msg3 in a Msg3 buffer. In the UL grant received in the RAR, the UE transmits an initial HARQ transmission of Msg3 (i.e., a MAC PDU including a CCCH message or an SDU from the Msg3 buffer) in step 1415. The UE starts an SDT timer/SDT error detection timer/T319a in step 1445, upon the initial HARQ transmission of Msg3 (i.e., the MAC PDU including the CCCH message or the SDU from the Msg3 buffer). The UE also starts contention resolution timer.

While the contention resolution timer is running, the UE receives a PDCCH addressed to a TC-RNTI indicating a UL grant for a HARQ retransmission of Msg3 in step 1420. The UE transmits a HARQ re-transmission of Msg3 (i.e., the MAC PDU including the CCCH message or the SDU) in step 1425, and the UE restarts the contention resolution timer.

While the contention resolution timer is running, if the UE receives a DL TB, which includes a contention resolution MAC CE, wherein the contention resolution identity in the MAC CE matches the CCCH SDU (or first 48 bits of CCCH SDU) in steps 1430 and 1435, the UE re-starts the SDT timer/SDT error detection timer/T319a in step 1440.

Alternately when the RA procedure initiated for an initial SDT transmission that is successfully completed or when the contention resolution is successful during the RA procedure initiated for the initial SDT transmission, the UE re-starts the SDT timer/SDT error detection timer/T319a.

If the contention resolution timer expires, the UE transmits Msg1 again. The UE receives PDCCH addressed to an RA-RNTI and successfully decodes the TB including an RAR. In the UL grant received in the RAR, the UE transmits an initial HARQ transmission of Msg3 (i.e., the MAC PDU including the CCCH message or the SDU from the Msg3 buffer). The UE does not re-starts the SDT timer/SDT error detection timer/T319a when it transmits the initial HARQ transmission of Msg3. The UE starts contention resolution timer.

EMBODIMENT 2-2-C

T319a Restarting Upon Receiving A Network Response for a 2 Step RA-SDT

A UE is in an RRC_CONNECTED state. The UE receives an RRCRelease message from a gNB with a suspend configuration. The UE enters an RRC_INACTIVE state upon receiving the RRCRelease message with the suspend configuration (or the UE enters an RRC_IDLE upon receiving the RRCRelease message without the suspend configuration).

Or:

A UE is in an RRC_INACTIVE state. The UE receives an RRCRelease message from a gNB with a suspend configuration during the SDT procedure in the RRC_INACTIVE state.

Or:

A UE is in an RRC_IDLE state. The UE receives an RRCRelease message from a gNB during the SDT procedure in the RRC_IDLE state.

While in an RRC_INACTIVE state (or in the RRC_IDLE state), upon arrival of data for one or more SDT RB(s), SDT criteria (DL RSRP of cell is above RSRP threshold, data available for SDT RB(s) is below the data volume threshold, etc.) is met and criteria to initiate RA-SDT is met, the UE initiates the RA-SDT procedure. For example, the UE initiates a 2 step RA for an RA-SDT procedure.

Figure 15:
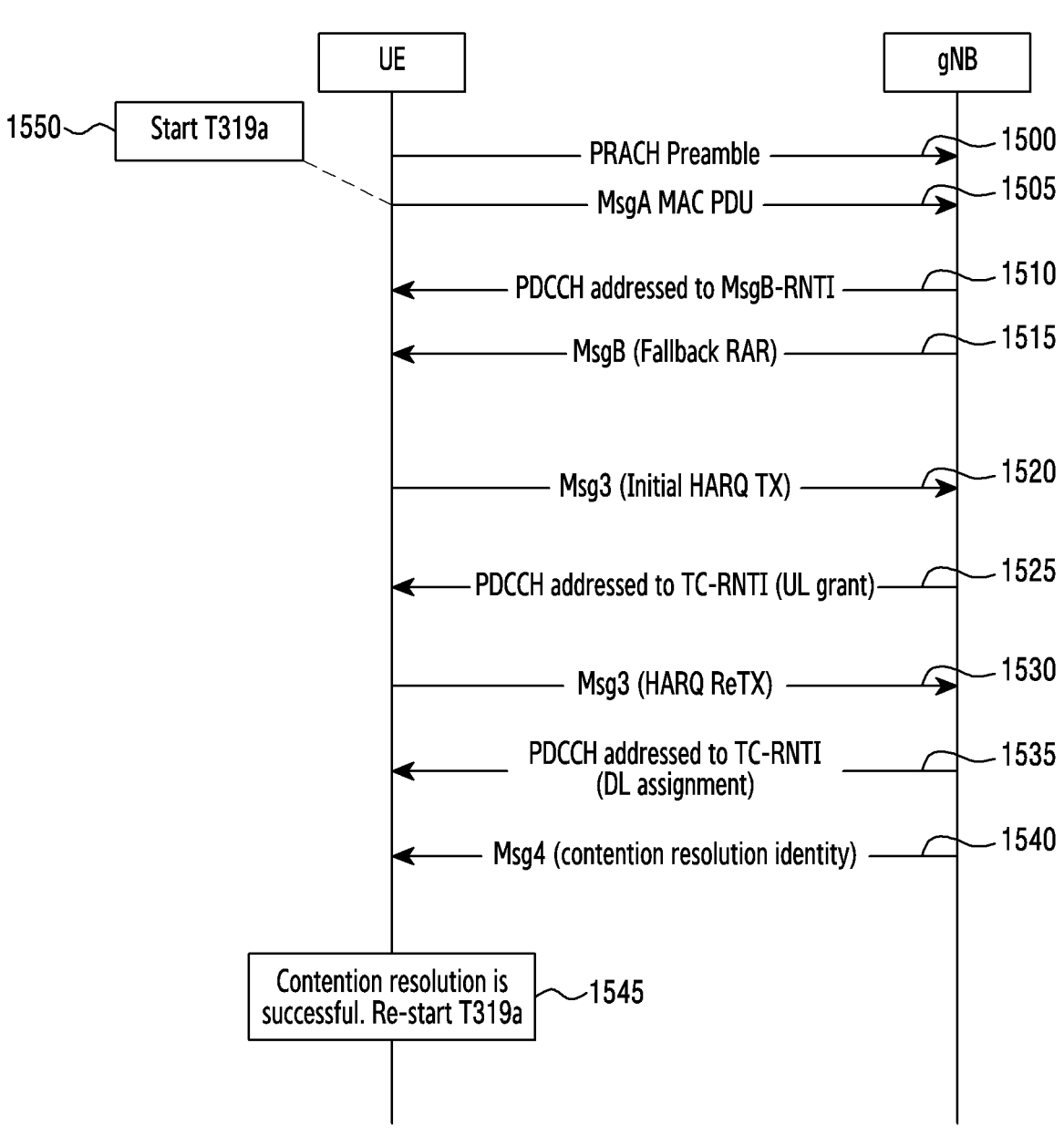
FIG. 15 is a signal flow diagram of an SDT procedure in accordance with an embodiment.

FIG. 15 is a signal flow diagram of an SDT procedure in accordance with an embodiment.

Referring to FIG. 15, upon initiation of an SDT procedure, the UE transmits MsgA (i.e., a PRACH preamble in a PRACH occasion and a MsgA MAC PDU in a PUSCH occasion) in steps 1500 and 1505. The MsgA MAC PDU is stored in a MsgA buffer. The UE starts an SDT timer/SDT error detection timer/T319a in step 1550, when transmitting the MsgA MAC PDU in the PUSCH occasion. The MsgA MAC PDU includes a CCCH message.

Upon transmitting MsgA, the UE monitors a PDCCH addressed to MsgB-RNTI in a MsgB response window. The UE receives the PDCCH addressed to the MSGB-RNTI in step 1510 and successfully decodes a TB including a fallback RAR in step 1515. The fallback RAR includes a UL grant. In the UL grant received in the fallback RAR, the UE transmits an initial HARQ transmission of Msg3 in step 1520, where the Msg3 is the MsgA MAC PDU from the MsgA buffer. The UE does not start the SDT timer/SDT error detection timer/T319a when transmitting the initial HARQ transmission of the Msg3, i.e., a retransmission of the MsgA MAC PDU. The UE starts a contention resolution timer.

While the contention resolution timer is running, the UE receives a PDCCH addressed to a TC-RNTI indicating a UL grant for a HARQ retransmission of Msg3 in step 1525. The UE transmits the HARQ re-transmission of Msg3 (i.e., the MAC PDU including the CCCH message or the SDU) (1530). The UE does not start the SDT timer/SDT error detection timer/T319a upon the HARQ re-transmission of Msg3. The UE restarts contention resolution timer.

While the contention resolution timer is running, if the UE receives a DL TB including a contention resolution MAC CE, wherein the contention resolution identity in the MAC CE matches the CCCH SDU (or first 48 bits of CCCH SDU) in steps 1535 and 1540, the UE re-starts the SDT timer/SDT error detection timer/T319a in step 1545.

Alternately when the RA procedure initiated for an initial SDT transmission that is successfully completed or when the contention resolution is successful during the RA procedure initiated for the initial SDT transmission, the UE re-starts SDT timer/SDT error detection timer/T319a.

If the contention resolution timer expires, the UE transmits MsgA again (i.e., a PRACH preamble in a PRACH occasion and a MsgA MAC PDU from a MsgA buffer in a PUSCH occasion). The UE does not start the SDT timer/SDT error detection timer/T319a upon transmitting the MsgA MAC PDU in the PUSCH occasion.

Upon transmitting MsgA, the UE monitors a PDCCH addressed to MsgB-RNTI in the MsgB response window. If the MsgB response window expires, the UE transmits MsgA again. The UE does not start the SDT timer/SDT error detection timer/T319a upon transmitting the MsgA MAC PDU in the PUSCH occasion.

Figure 16:
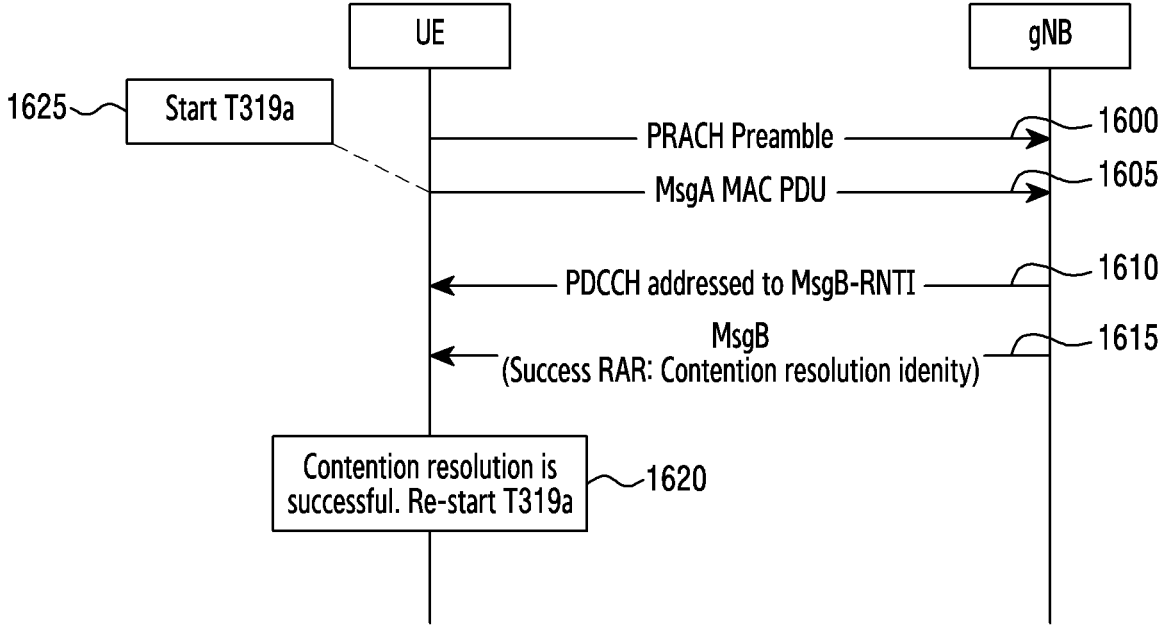
FIG. 16 is a signal flow diagram of an SDT procedure in accordance with an embodiment.

FIG. 16 is a signal flow diagram of an SDT procedure in accordance with an embodiment.

Referring to FIG. 16, upon initiation of the SDT procedure, a UE transmits MsgA (i.e., a PRACH preamble in a PRACH occasion and a MsgA MAC PDU in a PUSCH occasion) in steps 1600 and 1605. The MsgA MAC PDU is stored in the MsgA buffer.

The UE starts an SDT timer/SDT error detection timer/T319a in step 1625, upon transmitting the MsgA MAC PDU in the PUSCH occasion. The MsgA MAC PDU includes a CCCH message.

Upon transmitting MsgA, the UE monitors a PDCCH addressed to MsgB-RNTI in a MsgB response window. The UE receives the PDCCH addressed to MSGB-RNTI in step 1610 and successfully decodes a TB including a success RAR in step 1615. During the MsgB response window, if the UE receives a DL TB (or MsgB) including a contention resolution MAC CE, wherein the contention resolution identity in the MAC CE matches the CCCH SDU (or first 48 bits of CCCH SDU) in step 1615, the UE re-starts the SDT timer/SDT error detection timer/T319a in step 1620.

Alternately when the RA procedure initiated for an initial SDT transmission that is successfully completed or when the contention resolution is successful during the RA procedure initiated for the initial SDT transmission, the UE re-starts the SDT timer/SDT error detection timer/T319a.

In accordance with an embodiment, while the SDT procedure is ongoing (e.g., while the T319a is running), a gNB can send an RRC message, DCI, or a MAC CE to indicate to the UE to re-start the timer T319a. Upon receiving the indication, the UE re-starts the timer. Alternatively, while the SDT procedure is ongoing (e.g., while the T319a is running), the gNB can send an RRC message, DCI, or a MAC CE to indicate to the UE to re-start the timer T319a and the value of timer is also signaled. Upon receiving the indication, the UE re-starts the timer for the value received from the gNB.

After receiving a response from the network for an initial UL transmission including a CCCH message, the UE can send the remaining value of running timer T319a to a gNB in a MAC CE or an RRC message (e.g., a UE assistance information message or any other message). The gNB can then set the value of its timer T319a to that value.

If a UL grant has been received on the PDCCH for the MAC entity's C-RNTI after the initial CG-SDT transmission, i.e., a UL transmission of MAC PDU including CCCH message during the SDT procedure, if a downlink assignment for this PDCCH occasion and this serving cell has been received on the PDCCH for the MAC entity's C-RNTI after the initial CG-SDT transmission, if a UL grant for this PDCCH occasion has been received for this serving cell on the PDCCH for the MAC entity's CS-RNTI and if an NDI in the received HARQ information is 1, after the initial CG-SDT transmission, or if an RA procedure initiated for SDT is successfully completed or contention resolution is successful during RA procedure initiated for SDT, the UE can send the remaining value of running timer T319a to the gNB in a MAC CE or an RRC message (e.g., a UE assistance information message or any other message). The gNB can then set the value of its timer T319a to that value.

Figure 17:
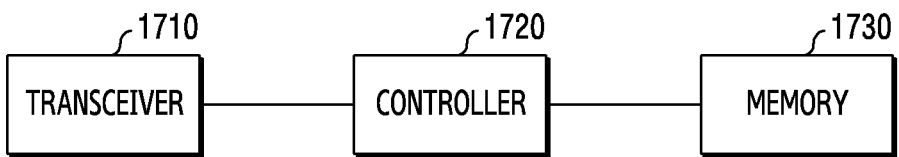
FIG. 17 illustrates a terminal according to an embodiment.

FIG. 17 illustrates a terminal according to an embodiment.

Referring to FIG. 17, a terminal includes a transceiver 1710, a controller 1720, and a memory 1730. The controller 1720 may refer to circuitry, an ASIC, or at least one processor. The transceiver 1710, the controller 1720, and the memory 1730 are configured to perform the operations of the UE illustrated in FIGS. 1 to 16 and described above.

Although the transceiver 1710, the controller 1720, and the memory 1730 are illustrated as separate entities, they may be realized as a single entity, e.g., a single chip. The transceiver 1710, the controller 1720, and the memory 1730 may be electrically connected to or coupled with each other.

The transceiver 1710 may transmit and receive signals to and from other network entities (e.g., a base station or another terminal).

The controller 1720 may control the UE to perform functions according to one of the embodiments described above.

Operations of the terminal may be implemented using the memory 1730 storing corresponding program codes. Specifically, the terminal may be equipped with the memory 1730 to store program codes implementing desired operations. To perform the desired operations, the controller 1720 may read and execute the program codes stored in the memory 1730 by using a processor or a central processing unit (CPU).

Figure 18:
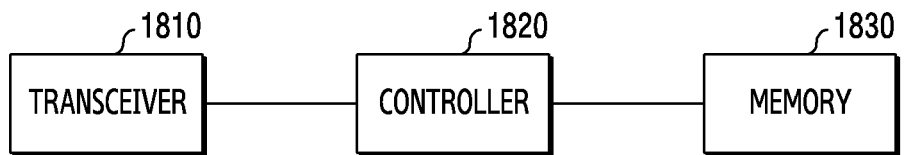
FIG. 18 illustrates a base station according to an embodiment.

FIG. 18 illustrates a base station according to an embodiment.

Referring to FIG. 18, the base station includes a transceiver 1810, a controller 1820, and a memory 1830. The transceiver 1810, the controller 1820, and the memory 1830 are configured to perform the operations of the network (e.g., gNB) illustrated in FIGS. 1 to 16 and described above.

Although the transceiver 1810, the controller 1820, and the memory 1830 are shown as separate entities, they may be realized as a single entity like a single chip. The transceiver 1810, the controller 1820, and the memory 1830 may be electrically connected to or coupled with each other.

The transceiver 1810 may transmit and receive signals to and from other network entities, e.g., a terminal.

The controller 1820 may control the base station to perform functions according to one of the embodiments described above. The controller 1820 may refer to circuitry, an ASIC, or at least one processor.

Operations of the base station may be implemented using the memory 1830 storing corresponding program codes.

Specifically, the base station may be equipped with the memory 1830 to store program codes implementing desired operations. To perform the desired operations, the controller 1820 may read and execute the program codes stored in the memory 1830 by using a processor or a CPU.

As described above, embodiments disclosed in the specification and drawings are merely used to present specific examples to easily explain the contents of the disclosure and to help understanding, but are not intended to limit the scope of the disclosure. Accordingly, the scope of the disclosure should be analyzed to include all changes or modifications derived based on the technical concept of the disclosure in addition to the embodiments disclosed herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:
   receiving, from a base station, a discontinuous reception (DRX) configuration and a DCP monitoring configuration, wherein a DCP refers to downlink control information (DCI) with a cyclic redundancy check (CRC) scrambled by a power saving radio network temporary identifier (PS-RNTI);
   receiving, from the base station, the DCP associated with a DRX cycle based on the DRX configuration and the DCP monitoring configuration, wherein the DCP includes an indication to start a DRX on-duration timer; and
   if the DCP further includes offset information, starting the DRX on-duration timer based on the indication after an offset obtained from the offset information, from an end of a slot in which the DCP was received,
   wherein the offset includes a first offset in a unit of a subframe and a second offset in a unit of a slot.

2. The method of claim 1, wherein the offset includes at least one subframe and a DRX slot offset for the DRX cycle.

3. The method of claim 1, wherein a DRX slot offset for the DRX cycle is set to the offset.

4. The method of claim 1, further comprising, if the DCP does not include the offset information, starting the DRX on-duration timer based on the indication after a DRX slot offset for the DRX cycle from a beginning of a subframe.

5. A method performed by a base station in a wireless communication system, the method comprising:
   transmitting, to a user equipment (UE), a discontinuous reception (DRX) configuration and a DCP monitoring configuration, wherein a DCP refers to downlink control information (DCI) with a cyclic redundancy check (CRC) scrambled by power saving radio network temporary identifier (PS-RNTI); and
   transmitting, to the UE, the DCP associated with a DRX cycle based on the DRX configuration and the DCP monitoring configuration,
   wherein the DCP includes an indication to start a DRX on-duration timer,
   wherein, if the DCP further includes offset information, a start of the DRX on-duration timer is based on the indication, and the start is after an offset associated with the offset information, from an end of a slot in which the DCP was transmitted, and
   wherein the offset includes a first offset in a unit of a subframe and a second offset in a unit of a slot.

6. The method of claim 5, wherein the offset includes at least one subframe and a DRX slot offset for the DRX cycle.

7. The method of claim 5, wherein a DRX slot offset for the DRX cycle is set to the offset.

8. The method of claim 5, wherein, if the DCP does not include the offset information, the start of the DRX on-duration timer is based on the indication, and the start is after a DRX slot offset for the DRX cycle from a beginning of a subframe.

9. A user equipment (UE) comprising:

at least one transceiver;

at least one processor communicatively coupled to the at least one transceiver; and at least one memory, communicatively coupled to the at least one processor, storing instructions executable by the at least one processor individually or in any combination to cause the UE to:

receive, from a base station, a discontinuous reception (DRX) configuration and a DCP monitoring configuration, wherein a DCP refers to downlink control information (DCI) with a cyclic redundancy check (CRC) scrambled by power saving radio network temporary identifier (PS-RNTI), receive, from the base station, the DCP associated with a DRX cycle based on the DRX configuration and the DCP monitoring configuration, wherein the DCP includes an indication to start a DRX on-duration timer, and if the DCP further includes offset information, start the DRX on-duration timer based on the indication after an offset obtained from the offset information, from an end of a slot in which the DCP was received, wherein the offset includes a first offset in a unit of a subframe and a second offset in a unit of a slot.

10. The UE of claim 9, wherein the offset includes at least one subframe and a DRX slot offset for the DRX cycle.

11. The UE of claim 9, wherein a DRX slot offset for the DRX cycle is set to the offset.

12. The UE of claim 9, wherein the instructions further cause the UE to:

if the DCP does not include the offset information, start the DRX on-duration timer based on the indication after a DRX slot offset for the DRX cycle from a beginning of a subframe.

13. A base station, comprising:

at least one transceiver; at least one processor communicatively coupled to the at least one transceiver; and at least one memory, communicatively coupled to the at least one processor, storing instructions executable by the at least one processor individually or in any combination to cause the base station to:

transmit, to a user equipment (UE), a discontinuous reception (DRX) configuration and a DCP monitoring configuration, wherein a DCP refers to downlink control information (DCI) with a cyclic redundancy check (CRC) scrambled by power saving radio network temporary identifier (PS-RNTI), and transmit, to the UE, the DCP associated with a DRX cycle based on the DRX configuration and the DCP monitoring configuration, wherein the DCP includes an indication to start a DRX on-duration timer, wherein, if the DCP further includes offset information, a start of the DRX on-duration timer is based on the indication, and the start is after an offset associated with the offset information, from an end of a slot in which the DCP was transmitted, and wherein the offset includes a first offset in a unit of a subframe and a second offset in a unit of a slot.

14. The base station of claim 13, wherein the offset includes at least one subframe and a DRX slot offset for the DRX cycle.

15. The base station of claim 13, wherein a DRX slot offset for the DRX cycle is set to the offset.

16. The base station of claim 13, wherein, if the DCP does not include the offset information, the start of the DRX on-duration timer is based on the indication, and the start is after a DRX slot offset for the DRX cycle from a beginning of a subframe.

* * * * *